US012764703B2

(12) United States Patent
Wang et al.

(10) Patent No.: US 12,764,703 B2
(45) Date of Patent: Oct. 13, 2026

(54) POSITIONING METHOD, COMMUNICATION DEVICE AND MEDIUM

(71) Applicant: VIVO MOBILE COMMUNICATION CO., LTD., Dongguan (CN)

(72) Inventors: Yuanyuan Wang, Dongguan (CN); Ye Si, Dongguan (CN); Huaming Wu, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 271 days.

(21) Appl. No.: 18/422,381

(22) Filed: Jan. 25, 2024

(65) Prior Publication Data

US 2024/0172167 A1 May 23, 2024

Related U.S. Application Data

(63) Continuation of application No. PCT/CN2022/107332, filed on Jul. 22, 2022.

(30) Foreign Application Priority Data

Jul. 26, 2021 (CN) ........................ 202110846337.4

(51) Int. Cl.
*H04W 64/00* (2009.01)
*H04B 17/318* (2015.01)
(Continued)

(52) U.S. Cl.
CPC .......... *H04W 64/00* (2013.01); *H04B 17/328* (2023.05); *H04W 72/25* (2023.01); *H04W 92/18* (2013.01)

(58) Field of Classification Search
CPC ..... H04W 64/00; H04W 72/25; H04W 92/18; H04B 17/328; H04L 5/0051; H04L 5/0094
(Continued)

(56) References Cited

U.S. PATENT DOCUMENTS 11,778,585 B2 * 10/2023 Wu .................... H04L 27/0006 370/329
11,974,335 B2 * 4/2024 Bao ...................... H04L 67/535
(Continued)

FOREIGN PATENT DOCUMENTS

CN 111869156 A 10/2020
WO 2020143619 A1 7/2020
(Continued)

OTHER PUBLICATIONS

European search opinion for EP 22848442 dated Oct. 14, 2024. (Year: 2024).*
(Continued)

*Primary Examiner* — Juan A Torres
(74) *Attorney, Agent, or Firm* — The Webb Law Firm

(57) ABSTRACT

A positioning method includes a first device performs a target operation, to assist a first terminal in positioning. The target operation includes transmitting a target message, transmitting a first SL-PRS, or selecting a target first resource. The target first resource is used for transmitting the first SL-PRS and/or transmitting the target message. The target message includes a positioning request, positioning assistance data, or first resource configuration information. The first resource configuration information is used for configuring at least one first resource. The target first resource is one or more resources in the at least one first resource. The first SL-PRS is used for determining location information of the first terminal and/or second terminal,
(Continued)

and/or SL-PRS measurement information. The second terminal is a peer terminal that performs SL communication or SL positioning with the first terminal.

18 Claims, 7 Drawing Sheets

(51) Int. Cl.
*H04W 72/25* (2023.01)
*H04W 92/18* (2009.01)

(58) Field of Classification Search
USPC ............. 455/456.1, 422, 440; 340/988, 996; 342/450
See application file for complete search history.

(56) References Cited

U.S. PATENT DOCUMENTS

| | | | | |
|---|---|---|---|---|
| 12,426,004 | B2 * | 9/2025 | Zhang | H04W 72/1263 |
| 2022/0236365 | A1 | 7/2022 | Ko et al. | |
| 2023/0050447 | A1 | 2/2023 | Ren et al. | |
| 2023/0062805 | A1 | 3/2023 | Baek et al. | |
| 2023/0117493 | A1 | 4/2023 | Li | |
| 2023/0199802 | A1 * | 6/2023 | Ganesan | H04W 72/25 370/329 |
| 2024/0236653 | A1 * | 7/2024 | Manolakos | G01S 5/0072 |
| 2024/0291607 | A1 * | 8/2024 | Sahin | H04L 5/0005 |

FOREIGN PATENT DOCUMENTS

| | | | |
|---|---|---|---|
| WO | 2020246842 | A1 | 12/2020 |
| WO | 2021129060 | A1 | 7/2021 |
| WO | 2021133104 | A1 | 7/2021 |
| WO | 2021135264 | A1 | 7/2021 |

OTHER PUBLICATIONS

First notice of examination opinions (Translated) for CN 202110846337 dated Apr. 19, 2025 (Year: 2025).*
Nth notice of examination opinions (Translated) for CN 202110846337 dated Aug. 30, 2025. (Year: 2025).*

* cited by examiner

POSITIONING METHOD, COMMUNICATION DEVICE AND MEDIUM

CROSS-REFERENCE TO RELATED APPLICATIONS

This application is a Bypass Continuation Application of PCT/CN2022/107332 filed on Jul. 22, 2022, which claims priority to Chinese Patent Application No. 202110846337.4 filed on Jul. 26, 2021, which are incorporated herein by reference in their entirety.

TECHNICAL FIELD

This application relates to the field of communication technologies, and in particular, to a positioning method, a communication device, and a medium.

BACKGROUND

Currently, a terminal can perform positioning by receiving a PRS sent by a network side. Configuration information of the PRS is usually determined based on a gNB or during installation on the network side, and does not support transmission and measurement of positioning reference signals between terminals.

SUMMARY

According to a first aspect, a positioning method is provided, including: A first device performs a target operation, to assist a first terminal in positioning, where the target operation includes at least one of the following: transmitting a target message, transmitting a first SL-PRS, or selecting a target first resource. The target first resource is used for transmitting the first SL-PRS and/or transmitting the target message. The target message includes at least one of the following: a positioning request, positioning assistance data, or first resource configuration information. The first resource configuration information is used for configuring at least one first resource. The target first resource is one or more resources in the at least one first resource. The first SL-PRS is used for determining: location information of the first terminal and/or second terminal, and/or SL-PRS measurement information. The second terminal is a peer terminal that performs SL communication or SL positioning with the first terminal.

According to a second aspect, a positioning apparatus is provided, including; an execution module, configured to perform a target operation, to assist a first terminal in positioning, where the target operation includes at least one of the following: transmitting a target message, transmitting a first SL-PRS, or selecting a target first resource. The target first resource is used for transmitting the first SL-PRS and/or transmitting the target message. The target message includes at least one of the following: a positioning request, positioning assistance data, or first resource configuration information. The first resource configuration information is used for configuring at least one first resource. The target first resource is one or more resources in the at least one first resource. The first SL-PRS is used for determining: location information of the first terminal and/or second terminal, and/or SL-PRS measurement information. The second terminal is a peer terminal that performs SL communication or SL positioning with the first terminal.

According to a third aspect, a communication device is provided. The terminal includes a processor, a memory, and a program or instructions stored in the memory and executable on the processor, wherein v n the program or the instructions are executed by the processor, steps of the method according to the first aspect are implemented.

According to a fourth aspect, a communication e is provided, including a processor and a communication interface. The processor is configured to perform a target operation, to assist a first terminal in positioning, where the target operation includes at least one of the following: transmitting a target message, transmitting a first SL-PRS, or selecting a target first resource. The target first resource is used for transmitting the first SL-PRS and/or transmitting the target message. The target message includes at least one of the following: a positioning request, positioning assistance data, or first resource configuration information. The first resource configuration information is used for configuring at least one first resource. The target first resource is one or more resources in the at least one first resource. The first SL-PRS is used for determining: location information of the first terminal and/or second terminal, and/or SL-PRS measurement information. The second terminal is a peer terminal that performs SL communication or SL positioning with the first terminal.

According to a fifth aspect, non-transitory readable storage medium is provided, storing a program or instructions, wherein when the program or the instructions are executed by a processor, steps of the positioning method according to the first aspect are implemented.

According to a sixth aspect, a chip is provided, where the chip includes a processor and a communication interface, the communication interface is coupled to the processor, and the processor is configured to run a program or instructions to implement the positioning method according to the first aspect.

According to a seventh aspect, a computer program/program product is provided, where the computer program/program product is stored in a non-volatile storage medium, and the program/program product is executed by at least one processor to implement the steps of the positioning method according to the first aspect.

DETAILED DESCRIPTION

The technical solutions in embodiments of this application are clearly described below with reference to the accompanying drawings in embodiments of this application. Apparently, the described embodiments are some rather than all of embodiments of this application. All other embodiments obtained by a person of ordinary skill in the art based on the embodiments of this application fall within the protection scope of this application.

The specification and claims of this application, and terms “first” and “second” are used to distinguish similar objects, but are not used to describe a specific sequence or order. It is to be understood that the terms termed in this way are interchangeable in a proper case, so that the embodiments of this application can be implemented in other orders than the orders illustrated or described herein. Moreover, the objects distinguished by “first” and “second” are usually of one type, and the quantity of objects is not limited. For example, there may be one or more first objects. In addition, “and/or” in the description and claims represents at least one of connected objects, and the character “/” generally indicates an “or” relationship between associated objects.

It should be noted that the technologies described in embodiments of this application are not limited to a long term evolution (LTE)/LTE-advanced (LTE-A) system, and may be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), and other systems. The terms “system” and “network” may be used interchangeably in embodiments of this application. The technology described can be applied to the systems and radio technologies described above, and can also be applied to other systems and radio technologies. The following description describes a new radio (NR) system for illustrative purposes, and NR terminology is used in most of the description below. These technologies are also applicable to applications other than NR system applications, for example, the 6th generation (6G) communication system.

Figure 1:
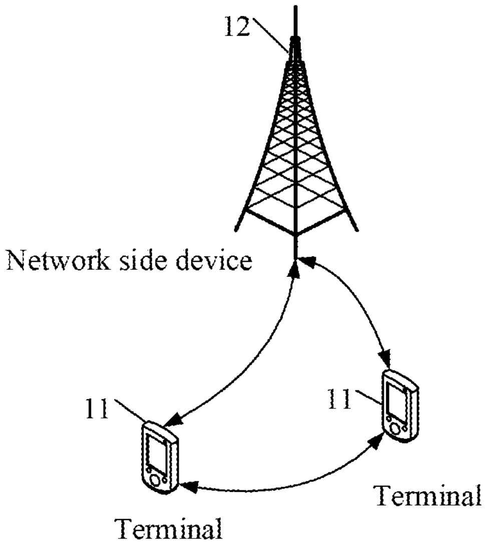
FIG. 1 is a schematic diagram of a possible communication system architecture according to an embodiment of this application.

FIG. 1 is a block diagram of a wireless communication system to which an embodiment of this application can be applied. The wireless communication system includes a terminal 11 and a network side device 12. The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), or smart home (home equipment with wireless communication functions, such as a refrigerator, a TV, a washing machine, or furniture). The wearable device includes: a smart watch, a smart band, smart headphones, smart glasses, smart jewelry (a smart bracelet, a smart ring, a smart necklace, a smart anklet, and the like), a smart wristband, smart clothing, a game console, and the like. It should be noted that in embodiments of this application, a type of the terminal 11 is not limited. The network side device 12 may be a base station or a core network, where the base station may be referred to as a Node B, an evolved Node B, an access point, a base transceiver station (BTS), a radio base station, a radio transceiver, a basic service set (BSS), an extended service set (ESS), a Node B, an evolved Node B (eNB), a Home Node B, a Home evolved Node B, a WLAN access point, a Wi-Fi Node, a transmitting receiving point (TRP), or another suitable term in the field. As long as the same technical effect is achieved, the base station is not limited to a specific technical vocabulary. It should be noted that, only a base station in an NR system is used as an example in the embodiments of this application, and the type of the base station is not limited.

In some scenarios (for example, scenarios with no network coverage or no GPS coverage or insufficient network coverage), the terminal may not be positioned. In other scenarios that require relative positioning (for example, autonomous driving and smart factories), a relative location of the terminal needs to be determined based on absolute positioning, resulting in deterioration of accuracy.

Currently, if it is assumed that a device within coverage can resolve conflicts and resource scheduling problems through network configurations, how a device out of coverage sends an SL-PRS is a concern of this application.

In the positioning method and apparatus, the device, and the medium provided in embodiments of this application, the first device requests, by performing the target operation, the first terminal to perform positioning. The target operation includes at least one of the following: transmitting the target message (including the positioning request and/or the positioning assistance data and/or the first resource configuration information), transmitting the first SL-PRS, or selecting the target first resource. In this way, the first device requests, by performing the target operation, the first terminal to perform positioning, and then determines the location information or SL-PRS measurement information of the first terminal and/or the second terminal that performs SL communication or SL positioning with the first terminal, thereby realizing positioning between terminals, solving the current situation that positioning needs to be performed under sufficient network or GPS coverage, and improving communication energy efficiency of the system. A device out of coverage can also request, according to the service request by transmitting the target message and/or the first SL-PRS, the first terminal to perform positioning:

The positioning method provided in embodiments of this application is described in detail below with reference to the accompanying drawings by using some embodiments and application scenarios.

Figure 2:
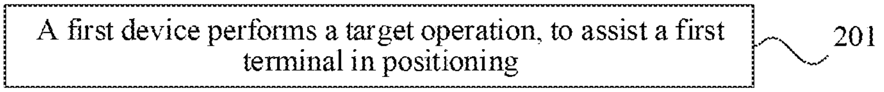
FIG. 2 is a first schematic flowchart of a positioning method according to an embodiment of this application.

An embodiment of this application provides a positioning method. As shown in FIG. 2, the positioning method provided in this embodiment of this application includes the following steps:

Step 201: A first device performs a target operation, to assist a first terminal in positioning.

In this embodiment of this application, the first device performs the target operation, to assist the first terminal in positioning.

It may be understood that the first device performs the target operation, to request, activate, trigger, or configure the first terminal to perform positioning.

In this embodiment of this application, the target operation includes at least one of the following: transmitting a target message, transmitting a first SL-PRS, or selecting a target first resource. The target first resource is used for transmitting the first SL-PRS and/or transmitting the target message.

In this embodiment of this application, the target message includes at least one of the following: a positioning request, positioning assistance data, location reporting or feedback information, SL-PRS measurement reporting or feedback information, a positioning response, capability information, or first resource configuration information.

In this embodiment of this application, the first resource configuration information is used for configuring at least one first resource; and the target first resource is one or more resources in the at least one first resource.

In this embodiment of this application, the first SL-PRS is used for determining: location information of the first terminal and/or second terminal, and/or SL-PRS location information; and the second terminal is a peer terminal that performs SL communication or SL positioning with the first terminal.

In this embodiment of this application, the foregoing first SL-PRS can also be considered as a request-based SL-PRS.

In this embodiment of this application, the first device includes any one of the following: the first terminal and a network side device.

Optionally, in this embodiment of this application, the first terminal may be a receiving terminal or a sending terminal.

Optionally, in this embodiment of this application, in a case that the first device is a network side device, the target operation includes at least one of the following: transmitting the target message, selecting the target first resource, or transmitting the first resource configuration information:

Optionally, in this embodiment of this application, in a case that the first device is the first terminal, the target operation includes at least one of the following: transmitting the target message, transmitting the first SL-PRS, transmitting the first resource configuration information, or selecting the target first resource.

Optionally, in this embodiment of this application, step 201 may include the following step 201*a:*

Step 201*a*: The first device performs the target operation, and assists the first terminal in performing positioning on a layer 1 at a higher level of the first device.

Optionally, in this embodiment of this application, before the foregoing step 201, the positioning method provided in this embodiment of this application may further include step 201*b:*

Step 201*b*; The first device transmits a location service request at a higher layer.

The location service request is used for requesting to trigger the first terminal to perform positioning.

Optionally, in this embodiment of this application, the location service request includes at least one of the following:

- a positioning service type (for example, SL UE spontaneous positioning) of the first terminal;
- location notification indication information;
- event reporting information;
- periodic reporting indication information;
- priority information;
- confidential information (for example, key information); or
- QoS information used for positioning.

For example, the location notification indication information indicates location environment information of the first terminal. In an example, the location environment information of the first terminal includes but is not limited to: LOS or NLOS, no GNSS signal, out of coverage, and the like.

For example, the event reporting information includes event information (for example, a relative distance is less than a threshold 1) of a first event, and the event reporting information indicates that at least one of location service, location information reporting, or SL-PRS measurement information reporting is triggered under the first event.

For example, the periodic reporting indication information indicates the first terminal and/or the second terminal to periodically trigger at least one of location service, location information reporting, or SL-PRS measurement information reporting.

Figure 3:
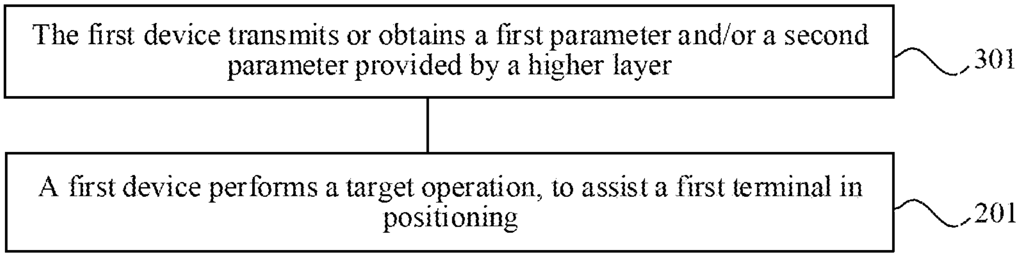
FIG. 3 is a second schematic flowchart of a positioning method according to an embodiment of this application.

Optionally, in this embodiment of this application, as shown in FIG. 3, the positioning method provided in this embodiment of this application may further include step 301;

Step 301: The first device transmits or obtains a first parameter and/or a second parameter provided by a higher layer.

The first parameter is used for transmitting the first SL-PRS; and the second parameter is used for selecting the target first resource.

Optionally, in this embodiment of this application, the first parameter includes at least one of the following:

- at least one pre-configured resource pool used for transmitting the first SL-PRS and/or the target message;
- priority information of the SL-PRS;
- priority information of the target message;
- a configuration parameter of at least one SL-PRS; or
- a number of frequency domain resources (for example, a number of sub channels) required by the at least one SL-PRS.

Optionally, in this embodiment of this application, the second parameter includes at least one of the following:

- indication information and/or configuration information of the at least one first resource;
- time domain and/or frequency domain indication information of the first resource;
- a measurement window of at least one SL-PRS;
- a selection window (for example, $[n+T_1, n+T_2]$) of at least one SL-PRS;
- a reference signal received power RSRP threshold corresponding to receiving at least one SL-PRS;

an RSRP threshold corresponding to sending at least one SL-PRS;

a priority threshold corresponding to receiving at least one SL-PRS;

a priority threshold corresponding to sending at least one SL-PRS;

a dedicated resource pool parameter of at least one SL-PRS;

a proportion of the target first resource in the first resource; or target first resource preemption indication information.

For example, the target first resource preemption indication information indicates whether the target first resource is allowed to be preempted.

For example, the target first resource preemption indication information may include: a PRS of another terminal, another uplink or SL signal or information, for example, a physical sidelink shared channel PSSCH or a physical sidelink control channel PSCCH.

For example, the foregoing measurement window Sensing of the SL-PRS may include a length of the Sensing, for example. TO slots, and a location of one Sensing, for example, $$[n - T_0, n - T^{SL}_{proc,0}].$$

For example, different priorities correspond to different RSRP thresholds.

For example, the dedicated resource pool parameter includes: a configuration parameter of the dedicated resource pool (for example, a periodicity), and an interval between a plurality of resource pools.

Optionally, in this embodiment of this application, the first resource configuration information includes a first resource candidate set, and the first resource candidate set includes at least one of the following:

identification information of a first resource candidate set;

identification information of a first resource of the first resource candidate set;

configuration information of the first resource; or configuration information of the first resource candidate set.

Optionally, in this embodiment of this application, the selecting the target first resource may include: excluding a second resource from the first resource candidate set, where the first resource candidate set includes the at least one first resource.

Optionally, in this embodiment of this application, the second resource includes at least one of the following:

a resource scheduled by first sidelink control information SCI and/or second SCI received by the first terminal;

a resource used for transmitting the first SCI and/or the second SCI;

a resource used for an synchronization signal physical broadcast and synchronization channel SS-PBSCH or an sidelink channel state information-reference signal SL CSI-RS or an sidelink demodulation reference signal SL DMRS;

a resource whose reference signal received power RSRP value does not meet an RSRP threshold for sending an SL-PRS;

a resource that does not meet a sending configuration of an SL-PRS;

a resource that is indicated by the first SCI and/or the second SCI received by the first terminal as a reserved resource; or a resource scheduled for another terminal to send an SL-PRS.

For example, the first SCI includes first-stage SCI or second-stage SCI or third-stage SCI; the second SCI includes first-stage SCI or second-stage SCI or third-stage SCI; and the third-stage SCI is dedicated to scheduling an SL-PRS.

For example, that the second resource does not meet the sending configuration of the SL-PRS includes at least one of the following that:

an available bandwidth of the second resource is less than a bandwidth of the SL-PRS;

a number of available symbols of the second resource is less than a number of symbols of the SL-PRS;

a periodicity of the second resource does not meet a requirement of the SL-PRS;

a priority of the second resource is higher than a sending priority of the SL-PRS;

a subcarrier spacing of the second resource is different from a subcarrier spacing of the SL-PRS; or a CP of the second resource is different from a CP of the SL-PRS.

Optionally, in this embodiment of this application, the configuration information of the first resource and/or the configuration information of the first resource candidate set includes at least one of the following:

bandwidth information of the first resource and/or the first resource set;

a frequency domain position start point of the first resource and/or the first resource set;

start resource block RB information of the first resource and/or the first resource set;

numerology information of the first resource and/or t e first resource set;

a subcarrier spacing of the first resource and/or the first resource set;

a CP cyclic prefix of the first resource and/or the first resource set;

start time of the first resource and/or the first resource set;

end time of the first resource and/or the first resource set;

duration of the first resource and/or the first resource set; or periodicity information of the first resource and/or the first resource set.

Optionally, in this embodiment of this application, the transmitting the first SL-PRS includes: transmitting the first SL-PRS in a case that a predetermined condition is met For example, the predetermined condition includes at least one of the following that:

received first-stage SCI indicates that an SL-PRS is enabled; or received second-stage SCI includes at least one of the following: a positioning request, positioning assistance data, a location information reporting or feedback resource configuration, an SL-PRS measurement reporting of feedback resource configuration, a configuration parameter of at least one SL-PRS, or a mode of at least one SL-PRS.

The first SL-PRS is one or more SL-PRSs in the at least one SL-PRS.

For example, a terminal 1 sends a positioning request. The positioning request includes at least one of the following: a measurement request or a location information reporting or feedback request.

Example 1: There are a plurality of SL-PRS measurement reporting or feedback resources used by the terminal 1 in response. The terminal 1 schedules a response and uses CDM, FDM, TDM, or the like to configure the SL-PRS measurement reporting or feedback resources.

Example 2; There is a conflict in a plurality of resources used for SL-PRS sending in positioning assistance data used by a terminal 2 in response.

The terminal 1 schedules a positioning response and uses CDM, FDM, TDM, or the like to configure the resources for SL-PRS sending.

Example 3: The terminal 1 determines the SL-PRS measurement reporting or feedback resources according to the positioning response. For example, eight ACKs are received, and the SL-PRS measurement reporting or feedback resources are scheduled respectively.

It should be noted that in the foregoing example, if the first terminal can be both a sending terminal and a receiving terminal, for example, the first terminal acts as a receiving terminal to receive the target message and acts as a sending terminal to send the SL-PRS, or the first terminal acts as a receiving terminal to receive the target message (for example, the positioning assistance data), and act as a sending terminal to send the target message (for example, the positioning request).

Optionally, in this embodiment of this application, when the first terminal transmits the first SL-PRS, the first SL-PRS may be transmitted based on the target message.

Optionally, in this embodiment of this application, the process of transmitting the first SL-PRS by the first terminal may include: The first terminal transmits the first SL-PRS and a user unit Uu interface positioning reference signal.

Optionally, in this embodiment of this application, the target message includes at least one of the following: a positioning request, positioning assistance data, location reporting or feedback information, SL-PRS measurement reporting or feedback information, a positioning response, or capability information.

It should be noted that the "measurement request" described in this embodiment of this application may be considered as an SL-PRS measurement request, and the "feedback indication information of a measurement request" may be considered as feedback indication information of the SL-PRS measurement request. The "measurement signal request" may be considered as an SL-PRS measurement signal request.

Optionally, in this embodiment of this application, the positioning request includes at least one of the following:

a positioning assistance data request;

a measurement request;

a location information reporting or feedback request;

an SL-PRS measurement reporting or feedback request;

a configuration request for at least one SL-PRS;

SL-PRS request indication information; or feedback indication information of a measurement request, where the positioning assistance data request is used for requesting the positioning assistance data;

the measurement request is used for requesting a device to measure the first SL-PRS;

the location information reporting or feedback request is used for requesting the device to report or feed back a resource of the location information, or requesting the device to report or feed back the location information;

the SL-PRS measurement reporting or feedback request is used for requesting the device to report or feed back a resource of the SL-PRS measurement information, or requesting the device to report or feed back the SL-PRS measurement information;

the configuration request is used for requesting configuration or transmission of the at least one SL-PRS;

the SL-PRS request indication information indicates whether the SL-PRS is requested; and the feedback indication information of the measurement request indicates that the first SL-PRS is received, and/or indicates whether the device requested through the measurement request sends feedback information, where the feedback information includes at least one of the following: the location information, the SL-PRS measurement information, or hybrid automatic repeat request HARQ information.

Optionally, in this embodiment of this application, the positioning assistance data request includes at least one of the following:

recognition information of a first target terminal;

recognition information of a second target terminal;

location information of a second target terminal;

a region identifier:

a communication range;

a positioning range;

positioning related quality of service QoS information;

a resource request for requesting to transmit a time frequency resource of the first SL-PRS;

a configuration request for at least one SL-PRS;

a location information reporting or feedback request;

an SL-PRS measurement reporting or feedback request;

expected angle of departure AOD information; or expected angle of arrival AOA information.

The first target terminal is any one of the following: the first terminal, the second terminal, and a third terminal, and the second target terminal is any one of the following: the first terminal, the second terminal, and the third terminal.

For example, the recognition information of the target terminal (namely, the first target terminal and/or the second target terminal) includes at least one of the following: user recognition information of one or more terminals, user group recognition information of one or more terminals, user time information of one or more terminals, user time source information of one or more terminals, scrambling information, CRC check information, bearer environment information, beacon ID, floor information, bearer sequence resource recognition or sequence resource set ID information, longitude, latitude, altitude, or other information.

Optionally, in this embodiment of this application, the measurement request includes at least one of the following:

a positioning type request (for example, UE-based or UE-assisted);

frequency band information (for example, license, Unlicense, FR1, or FR2);

a positioning method request (for example, sidelink based, sidelink+uu (for example, uu based, sidelink assisted or sidelink based, uuassisted));

a location information type (for example, location information (for example, absolute absolute location information or relative relative location information), or measurement information);

a measurement signal request;

priority information of measurement of the SL-PRS;

priority information of transmission of the SL-PRS;

expected angle of departure AOD information; or expected angle of arrival AOA information.

Optionally, in this embodiment of this application, the positioning request includes at least one of the following:

information about at least one SL-PRS configuration set;
first SL-PRS configuration information; or
second SL-PRS configuration information, where
the second SL-PRS configuration information may be configuration information of an SL-PRS expected by the first terminal and/or the second terminal; and the first SL-PRS configuration information may be understood as conventional SL-PRS configuration information.

In an example, the information about at least one SL-PRS configuration set includes at least one of the following:
the identification information of the at least one SL-PRS configuration set; or
a configuration parameter of an SL-PRS of the at least one SL-PRS configuration set.

It should be noted that the configuration parameter of the SL-PRS of the at least one SL-PRS configuration set may include configuration parameters of SL-PRSs of all or some SL-PRS configuration sets in the at least one SL-PRS configuration set. The configuration parameter of the SL-PRS in each SL-PRS configuration set may include configuration parameters of all or some SL-PRSs in the SL-PRS configuration set.

In an example, the configuration parameter of the SL-PRS in each SL-PRS configuration set in this embodiment of this application may include conventional SL-PRS configuration information (namely, the first SL-PRS configuration information in this application).

Optionally, in this embodiment of this application, the first SL-PRS configuration information or the configuration parameter of the SL-PRS includes at least one of the following:
a configuration parameter of an SL-PRS (SL-PRS Configuration Parameter);
a maximum number of frequency layers of the SL-PRS;
SL-PRS positioning frequency layer information;
an SL-PRS subcarrier spacing;
an SL-PRS resource bandwidth;
a start point of an SL-PRS physical resource block PRB (SL-PRS Start PRB);
a frequency domain position start point of the SL-PRS (SL-PRS PointA);
an SL-PRS comb size N;
an SL-PRS cyclic prefix;
an SL-PRS configuration per frequency layer;
identification information of the SL-PRS;
physical cell identifier PCI of the SL-PRS;
an absolute radio frequency channel number (ARFCN);
a cell global identity (for example, NR Cell Global Identity, NCGI);
a maximum number of SL-PRS resource sets;
SL-PRS resource set information;
an SL-PRS resource set identifier (SL-PRS Resource Set ID);
an SL-PRS periodicity and resource set slot offset;
an SL-PRS resource repetition factor;
an SL-PRS resource time gap;
an SL-PRS number of symbols;
a first muting option of the SL-PRS (SL-PRS Muting Option 1);
a second muting option of the SL-PRS (SL-PRS Muting Option 2);
resource power information of the SL-PRS (SL-PRS Resource Power);
a maximum number of SL-PRS resources included in each SL-PRS resource set in the at least one SL-PRS resource set (Maximum Number of SL-PRS Resources per Set);
SL-PRS resource information;
an SL-PRS resource identifier (SL-PRS Resource ID);
an SL-PRS sequence identifier (SL-PRS Sequence ID);
an SL-PRS resource element RE offset;
an SL-PRS resource slot offset; or
an SL-PRS resource symbol offset (SL-PRS Resource Symbol Off).

Optionally, in this embodiment of this application, the at least one SL-PRS configuration set includes: a target SL-PRS configuration set; the target SL-PRS configuration set includes a configuration of at least one target SL-PRS; and the first SL-PRS is one or more SL-PRSs in the at least one target SL-PRS.

In an example, the target SL-PRS configuration set includes at least one of the following:
identification information of the target SL-PRS configuration set (for example, sl-PRS-Config-Index);
location information of a second target terminal;
priority information of measurement of the target SL-PRS;
priority information of transmission of the target SL-PRS;
expected angle of departure AOD information;
expected angle of arrival AOA information; or
a configuration parameter of the target SL-PRS in the target SL-PRS configuration set.

Optionally, in this embodiment of this application, in a case that an SL-PRS configuration received by the first terminal does not meet a positioning requirement of the first terminal and/or the second terminal, or the SL-PRS configuration received by the first terminal does not include the target SL-PRS, the positioning request includes: at least one SL-PRS configuration set for on-demand selection, where the at least one SL-PRS configuration set includes a configuration of at least one target SL-PRS; and the first SL-PRS is one or more SL-PRSs in the at least one target SL-PRS.

The configuration parameter of the target SL-PRS may include at least one of the following:
a target SL-PRS configuration parameter;
a maximum number of frequency layers of the target SL-PRS;
target SL-PRS positioning frequency layer information;
a target SL-PRS subcarrier spacing;
a target SL-PRS resource bandwidth;
a start point of a target SL-PRS PRB (SL-PRS Start PRB);
a frequency domain position start point of the target SL-PRS (SL-PRS PointA);
a target SL-PRS comb size N;
a target SL-PRS cyclic prefix;
a target SL-PRS configuration per frequency layer;
identification information of the target SL-PRS;
PCI of the target SL-PRS;
an absolute radio frequency channel number (ARFCN);
a cell global identity (NR Cell Global Identity, NCGI);
a maximum number of target SL-PRS resource sets (Maximum Number of SL-PRS. Resource Sets);
target SL-PRS resource set information;
a target SL-PRS resource set identifier (SL-PRS Resource Set ID);
a target SL-PRS periodicity and resource set slot offset:
a target SL-PRS resource repetition factor;
a target SL-PRS resource time gap;
a target SL-PRS number of symbols;

- a first muting option of the target SL-PRS (SL-PRS Muting Option 1);
- a second muting option of the target SL-PRS (SL-PRS Muting Option 2);
- resource power information of the target SL-PRS (SL-PRS Resource Power);
- a maximum number of target SL-PRS resources included in each target SL-PRS resource set in the at least one target SL-PRS resource set (Maximum Number of SL-PRS Resources per Set);
- target SL-PRS resource information;
- a target SL-PRS resource identifier (SL-PRS Resource ID);
- a target SL-PRS sequence identifier (SL-PRS Sequence ID);
- a target SL-PRS RE offset;
- a target SL-PRS resource slot offset; or
- a target SL-PRS resource symbol offset (SL-PRS Resource Symbol Off).

It should be noted that the configuration parameter of the target SL-PRS may be the same as or different from the configuration parameter in the at least one SL-PRS configuration set.

Optionally, in this embodiment of this application, the second SL-PRS configuration information includes at least one of the following:

- bandwidth information of the SL-PRS;
- sending start time of the SL-PRS;
- sending end time of the SL-PRS;
- sending duration of the SL-PRS;
- measurement window information of the SL-PRS;
- configuration window information for configuring the SL-PRS;
- a number of combs configured for the SL-PRS;
- an SL-PRS number of symbols;
- a target terminal set;
- a number of target terminals;
- identification information of a target terminal;
- a set of selected SL-PRSs;
- resources of the selected SL-PRSs:
- identification information of the selected SL-PRSs;
- a resource set of the selected SL-PRSs;
- a number of the selected SL-PRSs;
- bandwidths of the selected SL-PRSs; or a dedicated resource set of the selected SL-PRSs;

It should be noted that the selected SL-PRS may be an SL-PRS selected by the first terminal or the target device. For example, there are a plurality of SL-PRS sets or SL-PRS resources configured for the first terminal or target device, and the first terminal or the target device selects at least one SL-PRS or SL-PRS resource for determining the location information of the first terminal and/or the second terminal.

Optionally, in this embodiment of this application, the first SL-PRS configuration information includes a configuration parameter of a dedicated resource; and the first SL-PRS is transmitted based on the dedicated resource, where the dedicated resource comprises at least one of the following: a resource dedicated to SL-PRS scheduling, or a resource dedicated to SL-PRS transmission.

It should be noted that the selected SL-PRS may be an SL-PRS selected by the first terminal or the target device. For example, there are a plurality of dedicated resources configured for the first terminal or target device for transmitting SL-PRSs, and the first terminal or the target device selects at least one dedicated resource for determining the location information of the first terminal and/or the second terminal.

For example, a configuration parameter of the dedicated resource includes at least one of the following:

- bandwidth information (for example, 100M, such as N subchannels) of the dedicated resource;
- a frequency domain position start point of the dedicated resource (point A);
- start RB information of the dedicated resource;
- numerology information of the dedicated resource;
- a subcarrier spacing of the dedicated resource;
- a CP cyclic prefix of the dedicated resource;
- start time (for example, a start symbol or a start slot) of the dedicated resource: end time (for example, an end symbol or an end slot) of the dedicated resource;
- duration (for example, a continuous symbol or a continuous slot) of the dedicated resource; or
- dedicated resource pool information.

Optionally, in this embodiment of this application, the positioning request includes at least one of the following:

- the positioning assistance data request and/or a Uu interface positioning assistance data request;
- the measurement request and/or a Uu interface signal measurement request;
- the location information reporting or feedback request and/or a Uu interface location information reporting or feedback request;
- at least one SL-PRS configuration set, and/or at least one downlink sounding reference signal SRS configuration set, and/or at least one uplink SRS configuration set; or
- the SL-PRS measurement reporting or feedback request and/or the Uu interface measurement reporting or feedback request.

It should be noted that the "and" situation in each item of the positioning request is used for positioning of SL+Uu, that is, for a scenario where SL assists Uu in positioning, or for a scenario where Uu assists SL in positioning.

Optionally, in this embodiment of this application, the positioning assistance data includes at least one of the following:

- a time frequency resource used for sending the SL-PRS;
- a time frequency resource for SL-PRS measurement reporting or feedback;
- a time frequency resource for location information reporting or feedback;
- a time frequency resource of measurement information reporting or feedback;
- at least one SL-PRS configuration set;
- the identification information of the at least one SL-PRS configuration set;
- a configuration parameter of an SL-PRS in each SL-PRS configuration set;
- recognition information of a first target terminal;
- recognition information of a second target terminal;
- a region identifier:
- a communication range;
- a positioning range;
- positioning related quality of service QoS information;
- priority information of measurement of the target SL-PRS; or
- priority information of transmission of the target SL-PRS.

The first target terminal one of the following: the first terminal, the second terminal, and a third terminal; and the second target terminal is any one of the following: the first terminal, the second terminal, and the third terminal.

For example, the time frequency resource used for sending the SL-PRS may be understood as first dedicated resource indication information. For example, the network side may reserve N first dedicated resources for transmitting the first SL-PRS.

For example, the identification information of the at least one SL-PRS configuration set may be understood as: the network side has reserved N SL-PRS configuration sets for sending of the first SL-PRS.

The configuration parameter of the SL-PRS in each SL-PRS configuration set includes at least one of the following:

a configuration parameter of an SL-PRS (SL-PRS Configuration Parameter);
a maximum number of frequency layers of the SL-PRS;
SL-PRS positioning frequency layer information;
an SL-PRS subcarrier spacing;
an SL-PRS resource bandwidth;
a start point of an SL-PRS PRB (SL-PRS Start PRB);
a frequency domain position start point of the SL-PRS (SL-PRS PointA);
an SL-PRS comb size N;
an SL-PRS cyclic prefix;
an SL-PRS configuration per frequency layer;
identification information of the SL-PRS;
PCI of the SL-PRS;
an absolute radio frequency channel number (ARFCN);
a cell global identity (NR Cell Global Identity, NCGI);
a maximum number of SL-PRS resource sets;
SL-PRS resource set information;
an SL-PRS resource set identifier (SL-PRS Resource Set ID);
an SL-PRS periodicity and resource set slot offset;
an SL-PRS resource repetition factor;
an SL-PRS resource time gap;
an SL-PRS number of symbols;
a first muting option of the SL-PRS (SL-PRS Muting Option 1);
a second muting option of the SL-PRS (SL-PRS Muting Option 2);
resource power information of the SL-PRS (SL-PRS Resource Power);
a maximum number of SL-PRS resources included in each SL-PRS resource set in the at least one SL-PRS resource set (Maximum Number of SL-PRS Resources per Set);
SL-PRS resource information;
an SL-PRS resource identifier (SL-PRS Resource ID);
an SL-PRS sequence identifier (SL-PRS Sequence ID):
an SL-PRS RE offset;
an SL-PRS resource slot offset; or
an SL-PRS resource symbol offset (SL-PRS Resource Symbol off).

Optionally, in this embodiment of this application, the positioning assistance data includes positioning assistance data of at least one target terminal. The positioning assistance data further includes at least one of the following:

location information of the at least one target terminal;
SL-PRS measurement information of the at least one target terminal;
type information of the at least one target terminal;
expected angle of departure AOD information corresponding to a target terminal; or
expected angle of arrival AOA information corresponding to the target terminal.

For example, the location information includes at least one of the following: absolute location information, relative location information, trajectory information, path information, speed information, or acceleration information; the SL-PRS measurement information includes at least one of the following: reference signal received power RSRP measurement information, reference signal time difference measurement information, receive and transmit time difference measurement information, arrival time measurement information, reference signal recognition information, reference signal received power information, angle measurement information, or transmitting and receiving point identification information; and the type information indicates any one of the following: whether the target terminal supports the SL-PRS, or whether the target terminal supports an SL positioning method, or whether the target terminal is indicated as a road side unit RSU device, or whether the target terminal is a specific type of terminal or a normal terminal.

Optionally, in this embodiment of this application, the positioning assistance data of at least one target terminal includes at least one of the following SL-PRS information corresponding to the target terminal:

the time frequency resource used for sending the SL-PRS;
the time frequency resource for the SL-PRS measurement reporting or feedback;
the time frequency resource for the location information reporting or feedback;
the time frequency resource for the measurement information reporting or feedback;
at least one SL-PRS configuration set;
the identification information of the at least one SL-PRS configuration set;
the priority information of measurement and/or transmission of the SL-PRS;
the expected angle of departure AOD information of transmission and/or measurement of the SL-PRS;
the expected angle of arrival AOA information of transmission and/or measurement of the SL-PRS; or
a configuration parameter of an SL-PRS in each SL-PRS configuration set of the at least one SL-PRS configuration set.

Optionally, in this embodiment of this application, the SL-PRS measurement reporting or feedback information includes at least one of the following:

recognition information of a first target terminal;
recognition information of a second target terminal;
location information of a second target terminal; or
SL-PRS measurement information.

For example, the SL-PRS measurement information includes at least one of the following: RSRP measurement information, reference signal time difference measurement information, receive and transmit time difference measurement information, arrival time measurement information, reference signal recognition information, reference signal received power information, information, or transmitting and receiving point identification information; the location information includes at least one of the following: absolute location information, relative location information, trajectory information, path information, speed information, or acceleration information; and the first target terminal is any one of the following: the first terminal, the second terminal, and a third terminal; and the second target terminal is any one of the following: the first terminal, the second terminal, and the third terminal.

Optionally, in this embodiment of this application, the positioning response includes at least one of the following:

error indication information;
error type information;
no available resource information;
error cause information;
positive acknowledgment ACK information;

negative acknowledgment NACK information;

unsupported on-demand selection of PRS information;

identification information of at least one SL-PRS configuration set;

request success indication information or request failure indication information;

configuration success indication information or configuration failure indication information;

a configuration parameter of an SL-PRS of the at least one SL-PRS configuration set;

recognition information of a first target terminal;

recognition information of a second target terminal;

a region identifier;

a communication range;

a positioning range;

positioning related QoS information;

a time frequency resource used for sending the SL-PRS; or a time frequency resource for SL-PRS measurement reporting or feedback.

The first target terminal is any one of the following: the first terminal, the second terminal, and a third terminal; and the second target terminal is any one of the following: the first terminal, the second terminal, and the third terminal.

Optionally, in this embodiment of this application, the capability information includes at least one of the following:

an SL-PRS processing capability; or a capability of an SL positioning method (for example, a capability of RTT, TOA, TDOA, AOA, or the like).

For example, the SL-PRS processing capability includes at least one of the following: a capability of processing an SL-PRS and a DL PRS simultaneously, a capability of processing an SL-PRS and a UL PRS simultaneously, an S-PRS buffer type (for example, a type 1 or a type 2, for symbol-level or slot-level buffer respectively), an SL-PRS-supported frequency band, a number of SL-PRS-supported frequency bands, a capability of supporting carrier aggregation, a maximum capability of processing an SL-PRS, SL-PRS duration, or a number of sent SL-PRSs. The capability of the SL positioning method includes at least one of the following: an SL-PRS measurement capability, a positioning mode (for example, UE-ASSISTED, ue-based, ue configure, or network configure), a multi-beam sending or measurement capability, quasi-co-location QCL, a path loss reference signal capability, a capability of supporting multipath measurement or reporting, or a capability of supporting first path measurement or reporting. The SL-PRS measurement capability includes at least one of the following: a maximum number of sending terminals measured, or a number of frequency layers measured.

Optionally, in this embodiment of this application, the target message includes at least one of the following:

indication information within coverage; or indication information out of coverage.

Within the coverage may be understood as within the network coverage, or within coverage of gps or gnss. There may be different indication information within further coverage, for example, within network coverage, Within network e may be, for another example, full coverage or partial coverage. The partial coverage may be understood as that some terminals in the area are within network coverage and some terminals are not within network coverage Optionally, in this embodiment of this application, in a case that the target device is the network side device, the target message is transmitted through one or more of the following messages: dynamic grant information (for example, Dynamic grant DCI 3_X), configured grant information (for example, Configured grant type-1 and type-2), a long term evolution positioning protocol LPP message, an radio resource control RRC message, and a medium access control-control element MAC CE message.

Optionally, in this embodiment of this application, in a case that the target device is the second terminal or the third terminal, the target message is transmitted through one or more of the following messages: sidelink control information SCI; a physical sidelink shared channel PSSCH; a PC5 LPP message; and a PC5 RRC message.

Optionally, in this embodiment of this application, the target message includes time domain offset information.

The time domain offset information includes at least one of the following:

offset information between SL-PRS measurement reporting or feedback and an SL-PRS;

offset information between location information reporting or feedback and the SL-PRS;

offset information between the positioning request and the SL-PRS;

offset information between the positioning request and the SL-PRS measurement reporting or feedback:

offset information between the SCI and the SL-PRS;

offset information between the SCI and the SL-PRS measurement reporting or feedback;

offset information between the SCI and the location information reporting or feedback; or offset information between the SCI and the positioning request.

For example, the SCI includes at least one of the following: first-stage SCI, second-stage SCI, or third-stage SCI, where the third SCI is dedicated to scheduling an SL-PRS.

Optionally, in this embodiment of this application, that the first terminal transmits the target message may be: The first terminal transmits the target message with the target device.

For example, the target device includes any one of the following: the second terminal, the network side device, and the third terminal.

In an example, when the target device is the second terminal, the first terminal interacts with the second terminal, that is, the first terminal is a sending terminal and the second terminal is a receiving terminal; or the first terminal is a receiving terminal, the second terminal is a sending terminal.

In an example, when the target device is the network side device, the first terminal interacts with the network side device, and the first terminal is a sending terminal, or the first terminal is a receiving terminal.

In an example, the third terminal is a scheduling terminal.

In an example, when the target terminal is the third terminal, the first terminal interacts with the third terminal. If the third terminal is a scheduling terminal, the first terminal is a sending terminal, first terminal is a receiving terminal.

Figure 4:
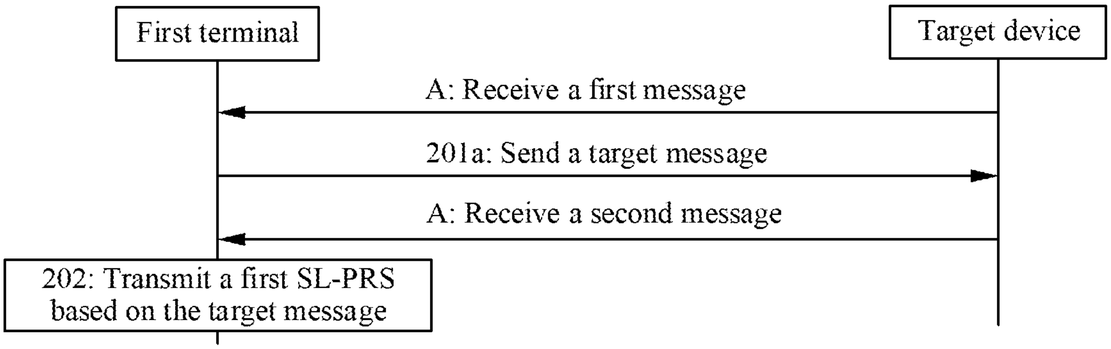
FIG. 4 is a third schematic flowchart of a positioning method according to an embodiment of this application.

Optionally, in this embodiment of this application, as shown in FIG. 4 (taking the opposite end as the target device as an example, the figure is just an example), that the first terminal transmits the target message may include the following step 201*a:*

Step 201*a*: The first terminal sends the target message.

Step 202: The first terminal transmits a first SL-PRS based on the target message.

For example, the first terminal sends the target message to the target device.

Based on step 201*a*, the positioning method provided in this embodiment of this application may further include:

Step A: The first terminal receives a first message before sending the target message; and/or the first terminal receives a second message after sending the target message.

For example, the first message includes at least one of the following: a positioning request, positioning assistance data, SL-PRS measurement reporting or feedback information, a positioning response, or capability information. The second message includes at least one of the following: a positioning request, positioning assistance data, SL-PRS measurement reporting or feedback information, a positioning response, or capability information.

In a possible example, the target message includes a positioning request; the first message includes positioning assistance data or a positioning response; and the second message includes configuration information of a target SL-PRS or activation information of the target SL-PRS.

Figure 5:
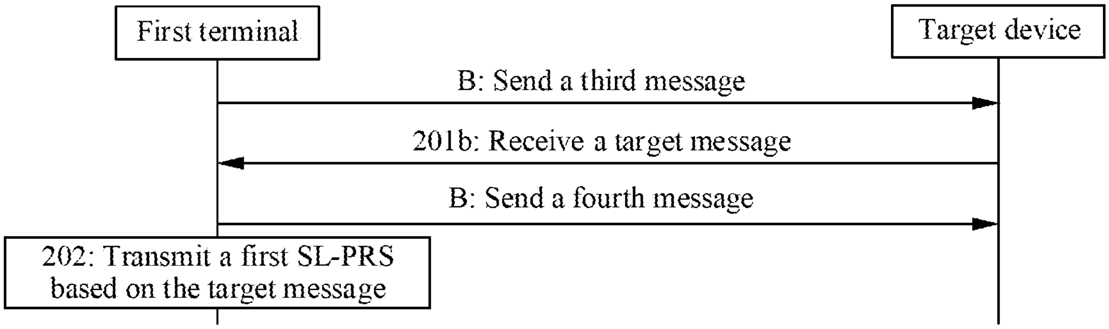
FIG. 5 is a fourth schematic flowchart of a positioning method according to an embodiment of this application.

Optionally, in this embodiment of this application, as shown in FIG. 5 (taking the opposite end as the target device as an example, the figure is just an example), the foregoing step 201 may include the following step 201*b:*

Step 201*b*: The first terminal receives the target message.

Step 202: The first terminal transmits a first SL-PRS based on the target message.

For example, the first terminal receives the target message from the target device.

Based on step 201*b*, the positioning method provided in this embodiment of this application may further include:

Step B: The first terminal sends a third message before receiving the target message; and/or the first terminal sends a fourth message after receiving the target message.

For example, the third message includes at least one of the following: positioning request, positioning assistance data, SL-PRS measurement reporting or feedback information, a positioning response, or capability information. The fourth message includes at least one of the following: a positioning request, positioning assistance data, SL-PRS measurement reporting or feedback information, a positioning response, or capability information.

In a possible example, the target message includes a positioning request; the third message includes positioning assistance data; and the fourth message includes a positioning response; where in a that the positioning request includes an SL-PRS measurement or reporting request, the positioning response includes a time frequency resource for SL-PRS measurement reporting or feedback of the SL-PRS; in a case that the positioning request includes a location information reporting or feedback request, the positioning response includes location information of a target terminal. The target terminal includes at least one of the following: the first terminal, the second terminal, or the third terminal.

Several examples are used below to illustrate how the first terminal performs positioning in this embodiment of this application.

Embodiment 1

Figure 6:
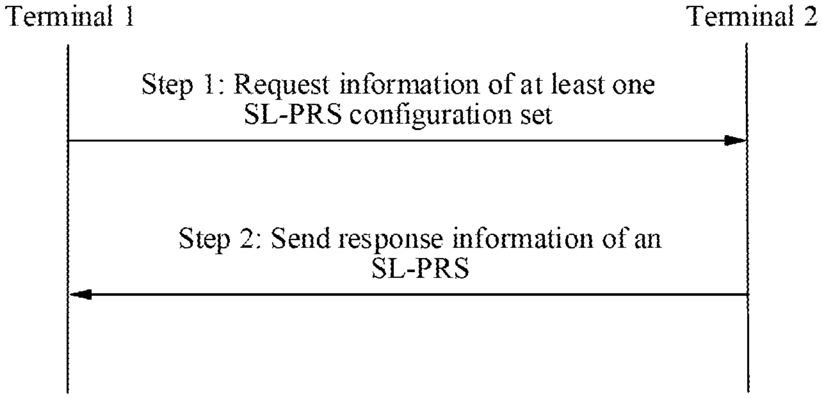
FIG. 6 is a fifth schematic flowchart of a positioning method according to an embodiment of this application.

As shown in FIG. 6, interaction between a Target UE and anchor UEs is taken as an example.

It should be noted that the Target UE and the anchor UEs are a description of the first terminal and the second terminal. In FIG. 6 to FIG. 15, the Target UE is taken as terminal 1 as an example, and the anchor UEs are taken as terminal 2 as an example for exemplary explanation.

Step 1: The Target UE sends at least one SL-PRS configuration set request information to the anchor UES.

For example, the at least one SL-PRS configuration set request information may include a positioning request. The positioning request may include: at least one SL-PRS configuration, and/or location information reporting or feedback resource configuration, and/or SL-PRS measurement information reporting or feedback resource configuration, and may further include a requested positioning type (for example, absolute of relative), and a positioning method (RTT, TDOA, AOA, AOD, or the like).

For example, the anchor UE (for example, RSU, a leader in a vehicle queue) is configured to: receive a positioning request, and/or configure an SL-PRS, and/or calculate a UE location. The target UE may be understood as the first terminal.

Step 2; The anchor UEs send SL-PRS response information.

For example, the response information may be a positioning response, and the positioning response may include: ACK, or a target SL-PRS configuration, or a target location information reporting or feedback resource configuration.

In addition, the anchor UEs send a target SL-PRS, the Target UE measures the SL-PRS, and the Target UE reports or feeds back measurement information.

Embodiment 2

Figure 7:
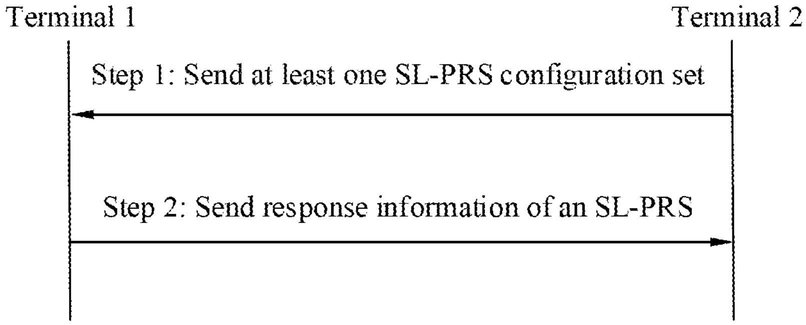
FIG. 7 is a sixth schematic flowchart of a positioning method according to an embodiment of this application.

As shown in FIG. 7, interaction between a Target UE and anchor UEs is taken as an example.

Step 1: The anchor UEs send at least one SL-PRS configuration set to the Target UE.

For example, SL-PRS configuration information of the at least one SL-PRS configuration set may include positioning assistance data. The positioning assistance data may include at least one SL-PRS configuration set, and/or a location information or measurement information reporting or feedback resource configuration.

For example, the SL-PRS configuration information of the at least one SL-PRS configuration set may be a target SL-PRS configuration and a target feedback resource configuration.

Step 2: The Target UE sends SL-PRS response information to the anchor UEs.

For example, the response information may include a positioning response or a positioning request. The positioning response or the positioning request may include: ack, or a target SL-PRS configuration, or a location information or SL-PRS measurement reporting or feedback resource configuration, or the like.

In addition, the anchor UEs send a target SL-PRS, the Target UE measures the target SL-PRS, and the Target UE reports or feeds back measurement information or location information.

Embodiment 3

Figure 8:
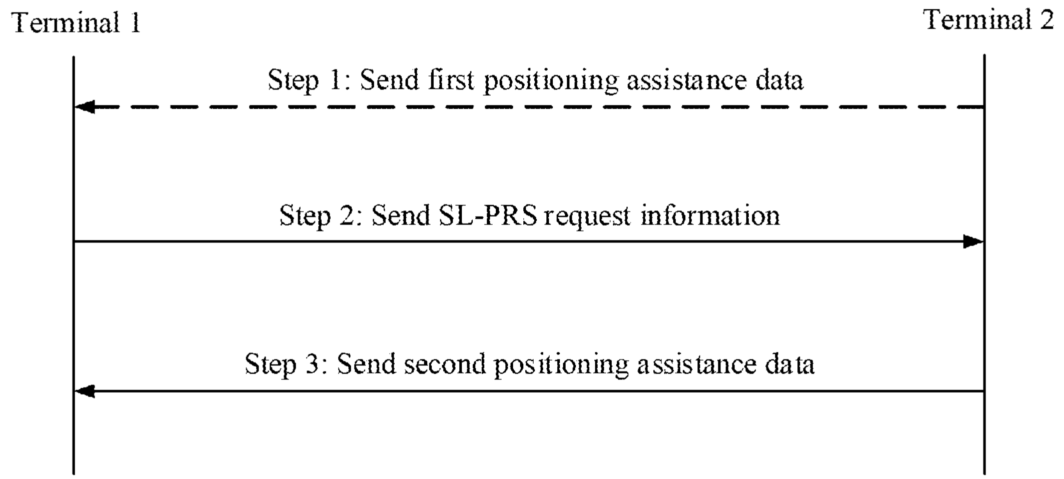
FIG. 8 is a seventh schematic flowchart of a positioning method according to an embodiment of this application.

As shown in FIG. 8, interaction between a Target UE and anchor UEs is taken as an example.

Step 1: The anchor UEs send first positioning assistance data to the Target UE.

For example, the first positioning assistance data may include at least one of the following:

at least one SL-PRS configuration set;

first SL-PRS configuration information;

a location information or SL-PRS measurement reporting or feedback resource configuration;

recognition information of the anchor UEs; or location information of the anchor UES.

Step 2: The Target UE sends SL-PRS request information to the anchor UEs.

For example, the SL-PRS request information may include the foregoing positioning request.

For example, the positioning request may include at least one of the following: ack;

at least one SL-PRS set configuration;

second SL-PRS configuration information;

a location information or SL-PRS measurement reporting or feedback configuration;

recognition information of the anchor UEs;

location information of the anchor UEs; or an SL-PRS configuration or a feedback resource configuration.

Optional, there may be only one of step 1 and step 2.

Step 3: The anchor UEs send second positioning assistance data to the Target UE.

For example, the second positioning assistance data may include a target SL-PRS configuration, and/or a location information or SL-PRS measurement reporting or feedback resource configuration.

In addition, the anchor UEs send a target SL-PRS, the Target UE measures the target SL-PRS, and the Target UE reports or feeds back measurement information.

It should be noted that in the foregoing Embodiment 1 to Embodiment 3, the target UE may alternatively be a terminal that sends the SL-PRS, and meanwhile, the anchor UEs are terminals for location information or SL-PRS measurement reporting or feedback. In addition, in an embodiment scenario, the target UE may alternatively be a terminal that sends the SL-PRS, the anchor UEs are terminals that feed back location information or measurement information to the target UE or scheduling UE, and the target UE or the scheduling UE reports the location information or the measurement information to the network side Embodiment 4

Figure 9:
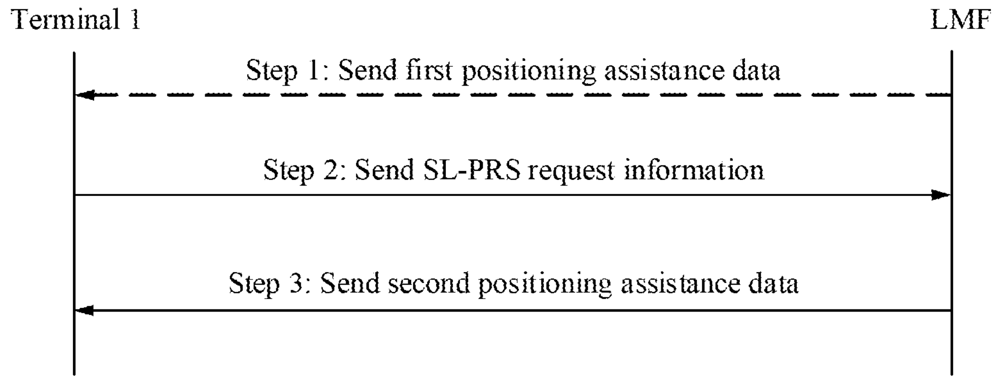
FIG. 9 is an eighth schematic flowchart of a positioning method according to an embodiment of this application.

As shown in FIG. 9, interaction between the Target UE and scheduling UEs or the network side device (where FIG. 9 is described by using the network side device as an example, and is described by using an LMF as an example) is used as an example.

Step 1: The scheduling UEs or the network side device sends first positioning assistance data to the Target UE.

For example, the first positioning assistance data may include a first SL-PRS configuration or a feedback resource configuration.

Step 2: The Target UE sends SL-PRS request information to the scheduling UEs or the network side device.

For example, the SL-PRS request information may be a positioning request. The positioning request includes ack or an SL-PRS configuration or a feedback resource configuration.

Step 3: The scheduling UEs or the network side device sends second positioning assistance data to the Target UE, For example, the second positioning assistance data may include a first target SL-PRS configuration and a feedback resource configuration.

Subsequently, the anchor UEs may further send third positioning assistance data to the Target UE.

For example, the third positioning assistance data may include a second target SL-PRS configuration and a feedback resource configuration.

In addition, the anchor UEs send a second target SL-PRS, the Target UE measures the target SL-PRS, and the Target UE reports or feeds back measurement information.

Figure 10:
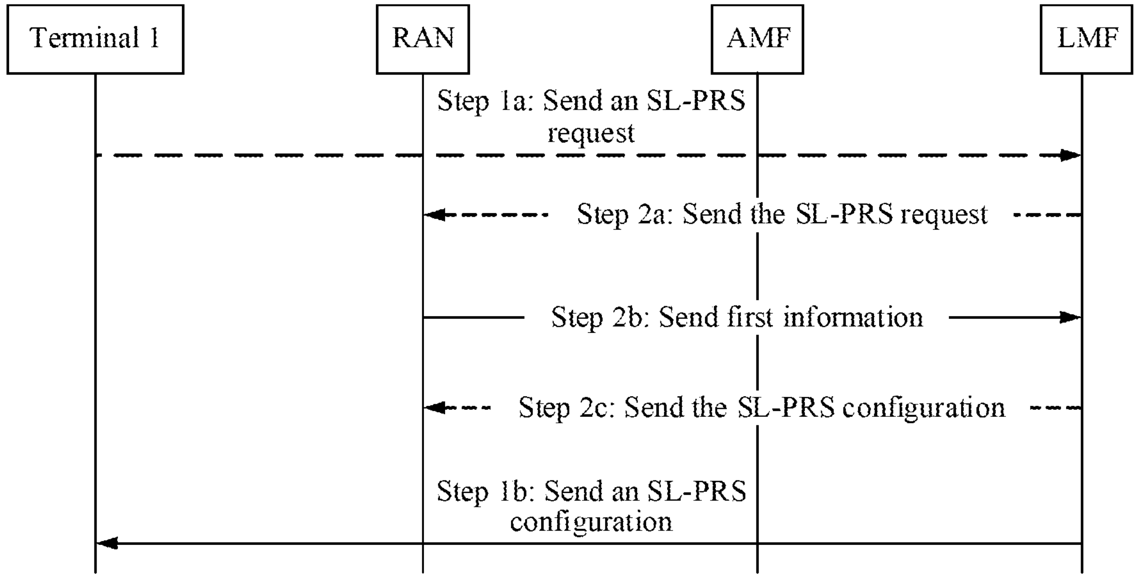
FIG. 10 is a ninth schematic flowchart of a positioning method according to an embodiment of this application.

Embodiment 5 (as Show in FIG. 10)

Step 1*a*: UE sends an SL-PRS request to an LMF.

Step 2*a*: The LMF sends the SL-PRS request to a RAN.

Step 2*b*: The RAN sends first information to an LAM, where the first information carries an SL-PRS response corresponding to the SL-PRS request.

Step 2*c*: The LAM sends SL-PRS configuration information to the RAN.

Step 1*b*: The LAM sends the SL-PRS configuration information to the terminal 1.

Figure 11:
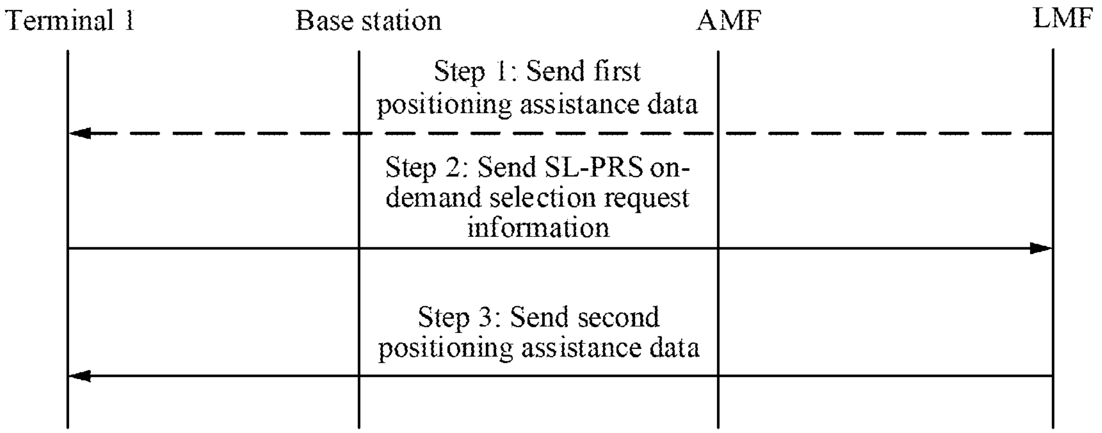
FIG. 11 is a tenth schematic flowchart of a positioning method according to an embodiment of this application.

Embodiment 6 (as Show in FIG. 11)

Step 1: The LMF sends first positioning assistance data to the terminal 1.

Step 2: The terminal 1 sends SL-PRS on-demand selection request information to the LMF.

Step 3: The LMF sends second positioning assistance data to the terminal 1.

Figure 12:
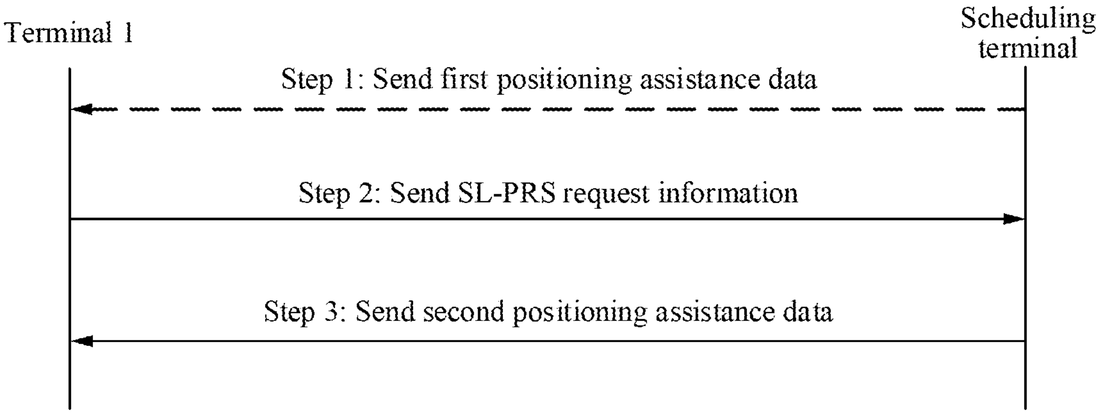
FIG. 12 is an eleventh schematic flowchart of a positioning method according to an embodiment of this application.

Embodiment 7 (as show in FIG. 12);

Step 1: A scheduling terminal sends first positioning assistance data to the terminal 1, Step 2: The terminal 1 sends SL-PRS request information to the scheduling terminal.

Step 3: The scheduling terminal sends second positioning assistance data to the terminal 1.

Figure 13:
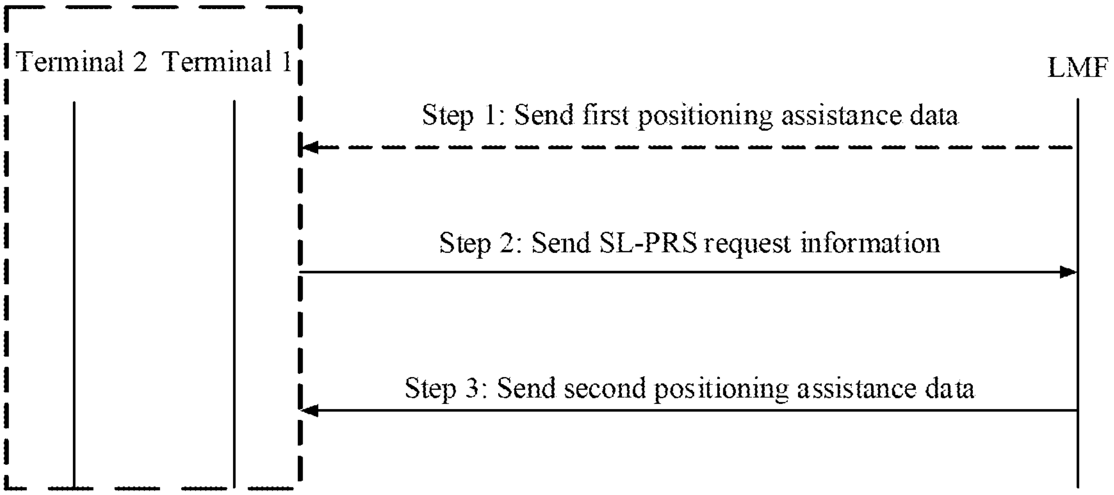
FIG. 13 is a twelfth schematic flowchart of a positioning method according to an embodiment of this application.

Embodiment 8 (as Show in FIG. 13)

Step 1: The LMF (or the scheduling terminal) sends first positioning assistance data to a target terminal (for example, a terminal 1 and/or a terminal 2).

Step 2: The target terminal sends SL-PRS request information to the LMF (or the scheduling terminal).

Step 3: The LMF (of the scheduling terminal) sends second positioning assistance data to the target terminal.

Figure 14:
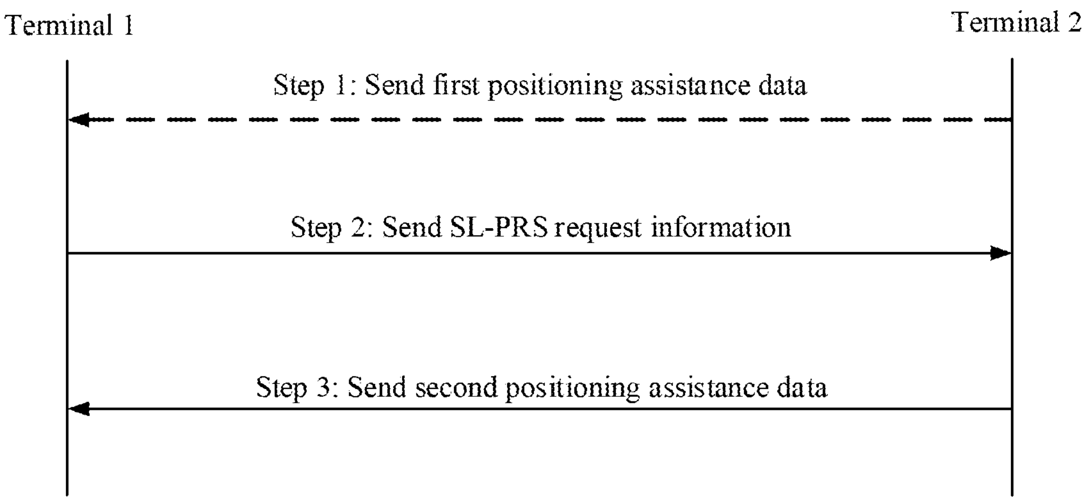
FIG. 14 is a thirteenth schematic flowchart of a positioning method according to an embodiment of this application.
Figure 15:
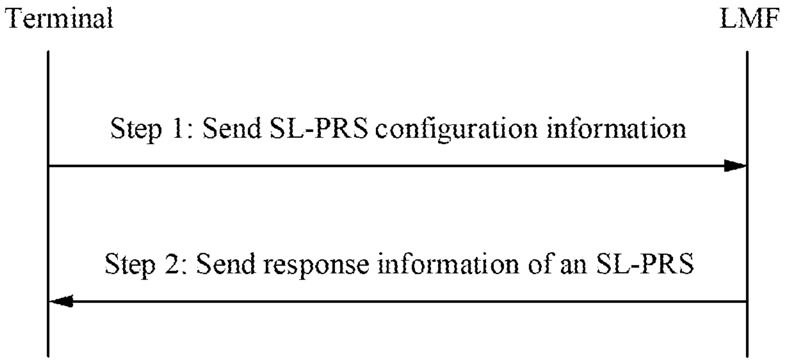
FIG. 15 is a fourteenth schematic flowchart of a positioning method according to an embodiment of this application.

Embodiment 9 (as Show in FIG. 14)

Step 1: The terminal 2 sends first positioning assistance data to the terminal 1.

Step 2: The terminal 1 sends SL-PRS request information to the terminal 2.

Step 3: The terminal 2 sends second positioning assistance data to the terminal Embodiment 10 (as Show in FIG. 15)

Step 1: The terminal sends SL-PRS configuration information to the LMF:

Step 2: The LMF sends SL-PRS response information to the terminal.

Figure 16:
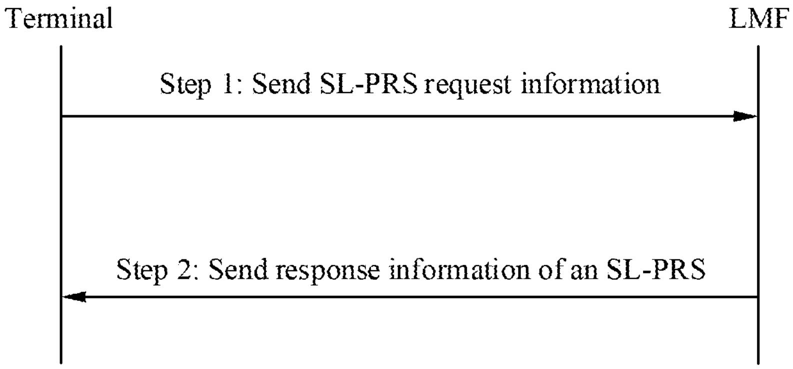
FIG. 16 is a fifteenth schematic flowchart of a positioning method according to an embodiment of this application.

Embodiment 11 (as Show in FIG. 16)

Step 1: The terminal sends SL-PRS request information to the LMF.

Step 2: The LMF sends SL-PRS response information to the terminal.

In the positioning method provided in embodiments of this application, the first device requests, by performing the target operation, the first terminal to perform positioning. The target operation includes at least one of the following: transmitting the target message (including the positioning request and/or the positioning assistance data and/or the first resource configuration information), transmitting the first SL-PRS, or selecting the target first resource. In this way, the first device requests, by performing the target operation, the first terminal to perform positioning, and then determines the location information or measurement information of the first terminal and/or the second terminal that performs SL communication or SL positioning with the first terminal, thereby realizing positioning between terminals, solving the current situation that positioning needs to be performed under sufficient network or OPS coverage, and improving communication energy efficiency of the system.

It should be noted that, for the positioning method provided in embodiments of this application, the execution body may be a positioning apparatus, or a control module in the positioning apparatus for executing the positioning method. In this embodiment of this application, the positioning apparatus provided in embodiments of this application is described by taking the positioning method performed by the positioning apparatus as an example.

Figure 17:
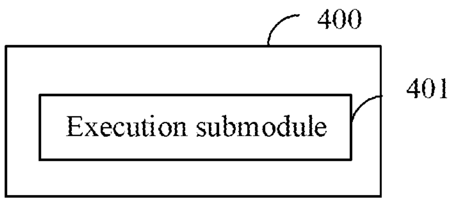
FIG. 17 is a first schematic diagram of a structure of a positioning apparatus according to an embodiment of this application.

An embodiment of this application provides a positioning apparatus. As shown in FIG. 17, the apparatus 400 includes an execution module 401.

The execution module 401 is configured to perform a target operation, to assist a first terminal in positioning, where the target operation includes at least one of the following: transmitting a target message, transmitting a first sidelink positioning reference signal SL-PRS, or selecting a target first resource.

The target first resource is used for transmitting the first SL-PRS and/or transmitting the target message.

The target message includes at least one of the following: a positioning request, positioning assistance data, or first resource configuration information.

The first resource configuration information is used for configuring at least one first resource.

The target first resource is one or more resources in the at least one first resource.

The first SL-PRS is used for determining: location information of the first terminal and/or second terminal, and/or SL-PRS measurement information.

The second terminal is a peer terminal that performs SL communication or SL positioning with the first terminal.

Optionally, in a case that the first device is a network side device, the target operation includes at least one of the following: transmitting the target message, selecting the target first resource, or transmitting the first resource configuration information; or in a case that the first device is the first terminal, the target operation includes at least one of the following: transmitting the target message, transmitting the first SL-PRS, transmitting the first resource configuration information, or selecting the target first resource.

Optionally, the execution module 401 is configured to perform the target operation, and assist the first terminal in performing positioning on a layer 1 at a higher level of the first device.

Figure 18:
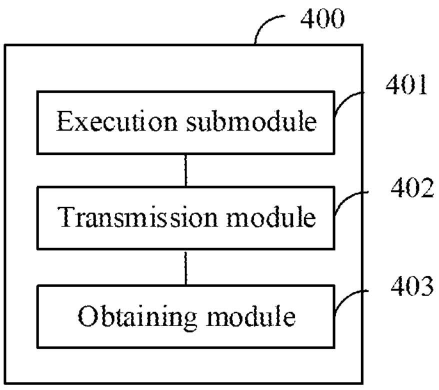
FIG. 18 is a second schematic diagram of a structure of a positioning apparatus according to an embodiment of this application.

Optionally, as shown in FIG. 18, the apparatus 400 further includes transmission module 402, where the transmission module 402 is configured to transmit a location service request at a higher layer before the target operation is performed, where the location service request is used for requesting to trigger the first terminal to perform positioning.

Optionally, the location service request includes at least one of the following: a positioning service type of the first terminal; location notification indication information; event reporting information: periodic reporting indication information; priority information; confidential information; or QoS information used for positioning, where the location notification indication information indicates location environment information of the first terminal; the event reporting information includes event information of a first event, and the event reporting information indicates that at least one of location service, location information reporting, or SL-PRS measurement information reporting is triggered under the first event; and the periodic reporting indication information indicates the first terminal and/or the second terminal to periodically trigger at least one of location service, location information reporting, or SL-PRS measurement information reporting.

Optionally, as shown in FIG. 18, the apparatus 400 further includes an obtaining module 403. The obtaining module 403 is configured to obtain a first parameter and/or a second parameter provided by a higher layer; or the transmission module 402 is configured to transmit a first parameter and/or a second parameter provided by a higher layer, where the first parameter is used for transmitting the first SL-PRS; and the second parameter is used for selecting the target first resource.

Optionally, the first parameter includes at least one of the following: at least one pre-configured resource pool used for transmitting the first SL-PRS and/or the target message; priority information of the SL-PRS; priority information of the target message; configuration parameter of at least one SL-PRS; or a number of frequency domain resources required by the at least one SL-PRS.

Optionally, the second parameter includes at least one of the following: indication information and/or configuration information of the at least one first resource; time domain and/or frequency domain indication information of the rce; a measurement window of at least one SL-PRS; a selection window of at least one SL-PRS; an RSRP threshold corresponding to receiving at least one SL-PRS; an RSRP threshold corresponding to sending at least one SL-PRS; a priority threshold corresponding to receiving at least one SL-PRS; a priority threshold corresponding to sending at least one SL-PRS; a dedicated resource pool parameter of at least one SL-PRS; a proportion of the target first resource in the first resource; or target first resource preemption indication information, where the target first resource preemption indication information indicates whether the target first resource is allowed to be preempted.

Optionally, the first resource configuration information includes a first resource candidate set, and the first resource candidate set includes at least one of the following: identification information of a first resource candidate set; identification information of a first resource of the first resource candidate set; configuration information of the first resource; or configuration information of the first resource candidate set.

Optionally, the selecting the target first resource includes: excluding a second resource from the first resource candidate set, where the first resource candidate set includes the at least one first resource.

Optionally, the second resource includes at least one of the following: a resource scheduled by first SCI and/or second SCI received by the first terminal; a resource used for transmitting the first SCI and/or the second SCI; a resource used for an SS-PBSCH or an SL CSI-RS or an SL DMRS; a resource whose RSRP value does not meet an RSRP threshold for sending an SL-PRS; a resource that not meet a sending configuration of an SL-PRS; a resource that is indicated by the first SCI and/or the second SCI received by the first terminal as a reserved resource; or a resource scheduled for another terminal to send an SL-PRS.

Optionally, the first SCI includes first-stage SCI or second-stage SCI or third-stage SCI; the second SCI includes first-stage SCI or second-stage SCI or third-stage SCI; and the third-stage SCI is dedicated to scheduling an SL-PRS.

Optionally, that the second resource does not meet the sending configuration of the SL-PRS includes at least one of the following that: an available bandwidth of the second resource is less than a bandwidth of the SL-PRS; a number of available symbols of the second resource is less than a number of symbols of the SL-PRS; a periodicity of the second resource does not meet a requirement of the SL-PRS; a priority of the second resource is higher than a sending priority of the SL-PRS; a subcarrier spacing of the second resource is different from a subcarrier spacing of the SL-PRS; or a CP of the second resource is different from a CP of the SL-PRS.

Optionally, the configuration information of the first resource and/or the configuration information of the first resource candidate set includes at least one of the following: bandwidth information of the first resource and/or the first resource set; a frequency domain position start point of the first resource and/or the first resource set; start RB information of the first resource and/or the first resource set; numerology information of the first resource and/or the first resource set; a subcarrier spacing of the first resource and/or the first resource set; a CP cyclic prefix of the first resource and/or the first resource set; start time of the first resource and/or the first resource set; end time of the first resource and/or the first resource set; duration of the first resource the first resource set; or periodicity information of the first resource and/or the first resource set.

Optionally, the transmission module 402 is configured to send the first SL-PRS in a case that a predetermined condition is met.

The predetermined condition includes at least one of the following that:

received first-stage SCI indicates that an SL-PRS is enabled; or received second-stage SCI includes at least one of the following: a positioning request, positioning assistance data, a location information reporting or feedback resource configuration, an SL-PRS measurement reporting or feedback resource configuration, a configuration parameter of at least one SL-PRS, or a mode of at least one SL-PRS, where the first SL-PRS is one or more SL-PRSs in the at least one SL-PRS.

Optionally, the target message further includes at least one of the following: location reporting or feedback information, SL-PRS measurement reporting or feedback information, a positioning response, or capability information.

Optionally, the positioning request includes at least one of the following: a positioning assistance data request; a measurement request; a location information reporting or feedback request; an SL-PRS measurement reporting or feedback request; a configuration request for at least one SL-PRS; SL-PRS request indication information; or feedback indication information of a measurement request, where the positioning assistance data request is used for requesting the positioning assistance data; the measurement request is used for requesting a device to measure the first SL-PRS; the location information reporting or feedback request is used for requesting the device to report or feed back a resource of the location information, or requesting the device to report or feed back the location information; the SL-PRS measurement reporting or feedback request is used for requesting the device to report or feed back a resource of the SL-PRS measurement information, or requesting the device to report or feed back the SL-PRS measurement information; the configuration request is used for requesting configuration or transmission of the at least one SL-PRS; the SL-PRS request indication information indicates whether the SL-PRS is requested; and the feedback indication information of the measurement request indicates that the first SL-PRS is received, and/or indicates whether the device requested through the measurement request sends feedback information, where the feedback information includes at least one of the following: the location information, the SL-PRS measurement information, or HARQ information.

Optionally, the positioning assistance data request includes at least one of the following: recognition information of a first target terminal; recognition information of a second target terminal; location information of the second target terminal; a region identifier; a communication range; a positioning range; positioning related quality of service QoS information; a resource request for requesting to transmit a time frequency resource of the first SL-PRS; a configuration request for at least one SL-PRS; a location information reporting or feedback request; or an SL-PRS measurement reporting or feedback request, where the first target terminal is any one of the following: the first terminal, the second terminal, and a third terminal; and the second target terminal is any one of the following: the first terminal, the second terminal, and the third terminal.

Optionally, the measurement request includes at least one of the following: positioning type request; frequency band information; a positioning method request; location information type; a measurement signal request; priority information of measurement of the SL-PRS; priority information of transmission of the SL-PRS: expected angle of departure AOD information; or expected angle of arrival AOA information.

Optionally, the positioning request includes at least one of the following: information about at least one SL-PRS configuration set; first SL-PRS configuration information; or second SL-PRS configuration information, where the second SL-PRS configuration information is configuration information of an SL-PRS expected by the first terminal and/or the second terminal; and the information about at least one SL-PRS configuration set includes at least one of the following: identification information of the at least one SL-PRS configuration set; or a configuration parameter of an SL-PRS of the at least one SL-PRS configuration set.

Optionally, the at least one SL-PRS configuration set includes a target SL-PRS configuration set: the target SL-PRS configuration set includes a configuration of at least one target SL-PRS; the first SL-PRS is one or more SL-PRSs in the at least one target SL-PRS; and the target SL-PRS configuration set includes at least one of the following: identification information of the target SL-PRS configuration set; location information of a second target terminal; priority information of measurement of the target SL-PRS: priority information of transmission of the target SL-PRS: expected angle of departure AOD information; expected angle of arrival AOA information; or a configuration parameter of the target SL-PRS in the target SL-PRS configuration set.

Optionally, in a case that an SL-PRS configuration received by the first terminal does not meet a positioning requirement of the first terminal and/or the second terminal, or the SL-PRS configuration received by the first terminal does not include the target SL-PRS, the positioning request includes; at least one SL-PRS configuration set for on-demand selection, where the at least one SL-PRS configuration set includes a configuration of at least one target SL-PRS; and the first SL-PRS is one or more SL-PRSs in the at least one target SL-PRS.

Optionally, the second SL-PRS configuration information includes at least one of the following: bandwidth information of the SL-PRS; sending start time of the SL-PRS; sending end time of the SL-PRS; sending duration of the SL-PRS; measurement window information of the SL-PRS; configuration window information for configuring the SL-PRS; a number of combs configured for the SL-PRS: an SL-PRS number of symbols; a target terminal set; a number of target terminals; identification information of a target terminal; a set of selected SL-PRSs; resources of the selected SL-PRSs; identification information of the selected SL-PRSs; a resource set of the selected SL-PRSs; or a number of the selected SL-PRSS.

Optionally, the first SL-PRS configuration information includes at least one of the following: a configuration parameter of an SL-PRS; a maximum number of frequency layers of the SL-PRS; SL-PRS positioning frequency layer information; an SL-PRS subcarrier spacing; an SL-PRS resource bandwidth; a start point of an SL-PRS PRB; a frequency domain position start point of the SL-PRS; an SL-PRS comb size N; an SL-PRS cyclic prefix; an SL-PRS configuration per frequency layer; identification information of the SL-PRS; PCI of the SL-PRS; an absolute radio frequency channel number ARFCN; a cell global identity NOGI; a maximum number of SL-PRS resource sets; SL-PRS resource set information; an SL-PRS resource set identifier; an SL-PRS periodicity and resource set slot offset; an SL-PRS resource repetition factor; an SL-PRS resource time gap; an SL-PRS number of symbols; a first muting option of the SL-PRS; a second muting option of the SL-PRS; resource power information of the SL-PRS; a maximum number of SL-PRS resources included in each SL-PRS resource set in the at least one SL-PRS resource set; SL-PRS resource information; an SL-PRS resource identifier; an SL-PRS sequence identifier; an SL-PRS RE offset; an SL-PRS resource slot offset; or an SL-PRS resource symbol offset.

Optionally, the first SL-PRS configuration information includes a configuration parameter of a dedicated resource; and the first SL-PRS is transmitted based on the dedicated resource, where the dedicated resource comprises at least one of the following a resource dedicated to SL-PRS scheduling, or a resource dedicated to SL-PRS transmission.

Optionally, the configuration parameter of the dedicated resource includes at least one of the following: bandwidth information of the dedicated resource; a frequency domain position start point of the dedicated resource; start RB information of the dedicated resource; numerology information of the dedicated resource; a subcarrier spacing of the dedicated resource; a CP cyclic prefix of the dedicated resource; start time of the dedicated resource; end time of the dedicated resource; duration of the dedicated resource; or dedicated resource pool information Optionally, the transmission module 402 is configured to transmit the first SL-PRS and a Uu interface positioning reference signal.

Optionally, the positioning request includes at least one of the following:

the positioning assistance data request and/or a Uu interface positioning assistance data request;

the measurement request and/or a Uu interface signal measurement request;

the location information reporting or feedback request and/or a Uu interface location information reporting or feedback request;

at least one SL-PRS configuration set, and/or at least one downlink sounding reference signal SRS configuration set, and/or at least one uplink SRS configuration set, or the SL-PRS measurement reporting or feedback request and/or the Uu interface measurement reporting or feedback request.

Optionally, the positioning assistance data includes at least one of the following: a time frequency resource used for sending the SL-PRS; a time frequency resource for location information reporting or feedback; a time frequency resource for measurement information reporting or feedback; at least one SL-PRS configuration set; identification information of the at least one SL-PRS configuration set; a configuration parameter of an SL-PRS in each SL-PRS configuration set; recognition information of a first target terminal; recognition information of a second target terminal; a region identifier; a communication range; a positioning range; positioning related quality of service QoS information; priority information of measurement of the target SL-PRS; or priority information of transmission of the target SL-PRS, where the first target terminal is any one of the following; the first terminal, the second terminal, and a third terminal; and the second target terminal is any one of the following: the first terminal, the second terminal, and the third terminal.

Optionally, the positioning assistance data includes positioning assistance data of at least one target terminal. The positioning assistance data further includes at least one of the following: location information of the at least one target terminal; SL-PRS measurement information of the at least one target terminal; type information of the at least one target terminal: expected angle of departure AOD information corresponding to a target terminal; or expected angle of arrival AOA information corresponding to the target terminal, where the location information includes at least one of the following: absolute location information, relative location information, trajectory information, path information, speed information, or acceleration information; the SL-PRS measurement information includes at least one of the following: reference signal received power RSRP measurement information, reference signal time difference measurement information, receive and transmit time difference measurement information, arrival time measurement information, reference signal recognition information, reference signal received power information, angle measurement information, or transmitting and receiving point identification information; and the type information indicates any one of the following: whether the target terminal supports the SL-PRS, or whether the target terminal supports an SL positioning method, or whether the target terminal is indicated as an RSU device, or whether the target terminal is a specific type of terminal or a normal terminal.

Optionally, the positioning assistance data of at least one target terminal includes at least one of the following SL-PRS information corresponding to the target terminal: the time frequency resource used for sending the SL-PRS; a time frequency resource for the SL-PRS measurement reporting or feedback; the time frequency resource for the location information reporting or feedback; the time frequency resource for the measurement information reporting or feedback; the at least one SL-PRS configuration set; the identification information of the at least one SL-PRS configuration set; the priority information of measurement and/or transmission of the SL-PRS; the expected angle of departure AOD information of transmission and/or measurement of the SL-PRS; the expected angle of arrival AOA information of transmission and/or measurement of the SL-PRS; or the configuration parameter of the SL-PRS in each SL-PRS configuration set.

Optionally, the SL-PRS measurement reporting or feedback information includes at least one of the foll g: recognition information of a first target terminal; recognition information of a second target terminal; location information of the second target terminal; or SL-PRS measurement information, where the SL-PRS measurement information includes at least one of the following: RSRP measurement information, reference signal time difference measurement information, receive and transmit time difference measurement information, arrival time measurement information, reference signal recognition information, reference signal received power information, angle measurement information, or transmitting and receiving point identification information; the location information includes at least one of the following: absolute location information, relative location information, trajectory information, path information, speed information, or acceleration information; and the first target terminal is any one of the following: the first terminal, the second terminal, and a third terminal; and the second target terminal is any one of the following: the first terminal, the second terminal, and the third terminal, Optionally, the positioning response includes at least one of the following: error indication information; error type information; no available resource information; error cause information; positive acknowledgment ACK information; negative acknowledgment NACK information; unsupported on-demand selection of PRS information: identification information of at least one SL-PRS configuration set; request success indication information or request failure indication information; configuration success indication information or configuration failure indication information; a configuration parameter of an SL-PRS of the at least one SL-PRS configuration set; recognition information of a first target terminal; recognition information of a second target terminal; a region identifier; a communication range; a positioning range; positioning related QoS information; a time frequency resource used for sending the SL-PRS; or a time frequency resource for SL-PRS measurement reporting or feedback. The first target terminal is any one of the following: the first terminal, the second terminal, and a third terminal; and the second target terminal is any one of the following: the first terminal, the second terminal, and the third terminal.

Optionally, the capability information includes at least one of the following: an SL-PRS processing capability; or a capability of an SL positioning method.

The SL-PRS processing capability includes at least one of the following: a capability of processing an SL-PRS and a DL PRS simultaneously, a capability of processing an SL-PRS and a UL PRS simultaneously, an S-PRS buffer type, an SL-PRS-supported frequency band, a number of SL-PRS-supported frequency bands, a capability of supporting carrier aggregation, a maximum capability of processing an SL-PRS, SL-PRS duration, or a number of sent SL-PRSs. The capability of the SL positioning method includes at least one of the following: an SL-PRS measurement capability, a positioning mode, a multi-beam sending or measurement capability, quasi-co-location QCL, a path loss reference signal capability, a capability of supporting multipath measurement or reporting, or a capability of supporting first path measurement or reporting. The SL-PRS measurement capability includes at least one of the following: a maximum number of sending terminals measured, or a number of frequency layers measured.

Optionally, the target message includes at least one of the following: indication information within coverage; or indication information out of coverage.

Optionally, in a case that the transmission module 402 transmits the target message with a network side device, the target message is transmitted through one or more of the following messages: dynamic grant information; configured grant information; an LPP message; an RRC message; and a MAC CE message.

Optionally, in a case that the transmission module 402 transmits the target message with another terminal, the target message is transmitted through one or more of the following messages: sidelink control information SCI; a physical sidelink shared channel PSSCH; a PC5 LPP message; and a PC5 RRC message.

Optionally, the target message includes time domain offset information.

The time domain offset information includes at least one of the following: offset information between SL-PRS measurement reporting or feedback and an SL-PRS; offset information between location information reporting or feedback and the SL-PRS; offset information between the positioning request and the SL-PRS; offset information between the positioning request and the SL-PRS measurement reporting or feedback; offset information between the SCI and the SL-PRS; offset information between the SCI and the SL-PRS measurement reporting or feedback; offset information between the SCI and the location information reporting or feedback; or offset information between the SCI and the positioning request.

Optionally, the SCI includes at least one of the following: first-stage SCI, second-stage SCI, or third-stage SCI, where the third SCI is dedicated to scheduling an SL-PRS.

Optionally, the transmission module 402 is configured to send the target message. The transmission module 402 is further configured to receive a first message before: sending the target message; and/or receive a second message after sending the target message.

Optionally, the target message includes a positioning request; the first message includes positioning assistance data or a positioning response; and the second message includes configuration information of a target SL-PRS or activation information of the target. SL-PRS.

Optionally, the transmission module 402 is configured to receive the target message; and the transmission module 402 is further configured to receive a third message before receiving the target message; and/or receive a fourth message after receiving the target message.

Optionally, the target message includes a positioning request, the third message includes positioning assistance data; and the fourth message includes a positioning response, where in a case that the positioning request includes an SL-PRS measurement or reporting request, the positioning response includes a time frequency resource for SL-PRS measurement reporting or feedback of the SL-PRS; in a case that the positioning request includes a location information reporting or feedback request, the positioning response includes location information of a target terminal; in a case that the positioning request includes an SL-PRS measurement reporting or feedback request, the positioning response includes measurement information of the target terminal; and the target terminal is any one of the following: the first terminal, the second terminal, and the third terminal.

In the positioning apparatus provided in embodiments of this application, the apparatus requests, by performing the target operation, the first terminal to perform positioning. The target operation includes at least one of the following:

transmitting the target message (including the positioning request and/or the positioning assistance data and/or the first resource configuration information), transmitting the first SL-PRS, or selecting the target first resource. In this way, the target operation is performed, to request the first terminal to perform positioning, and then the location information or measurement information of the first terminal and/or the second terminal that performs SL communication or SL positioning with the first terminal is determined, thereby realizing positioning between terminals, solving the current situation that positioning needs to be performed under sufficient network or GPS coverage, and improving communication energy efficiency of the system.

The positioning apparatus in this embodiment of this application may be an apparatus, an apparatus with an operating system or an electronic device, or may be a component, an integrated circuit, or a chip in a terminal. The apparatus or electronic device may be a mobile terminal or may be a non-mobile terminal. For example, the mobile terminal may include, but is not limited to, the types of the terminal 11 listed above, and the non-mobile terminal may be a server, a network attached storage (NAS), a personal computer (PC), a television (TV), a teller machine, a self-service machine, or the like. This is not limited in this embodiment of this application.

The positioning apparatus provided in embodiments of this application can implement the processes implemented in the method embodiments of FIG. 2 to FIG. 16, and achieve the same technical effects. To avoid repetition, details are not described herein again.

Figure 19:
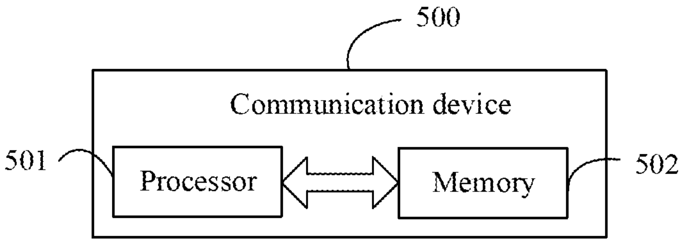
FIG. 19 is a schematic diagram of a hardware structure of a communication device according to an embodiment of this application.

Optionally, as shown in FIG. 19, an embodiment of this application further provides a communication device 500, including a processor 501, a memory 502, and a program or instructions stored in the memory 502 and executable on the processor 501. For example, the communication device 500 is a terminal. The program or the instructions, when executed by the processor 501, implement the processes of the embodiments of the positioning method, and can achieve the same technical effects. When the communication device 500 is a network side device, the program or the instructions, when executed by the processor SOI, implement the processes of the embodiments of the positioning method, and can achieve the same technical effects. To avoid repetition, details are not described herein again.

Figure 20:
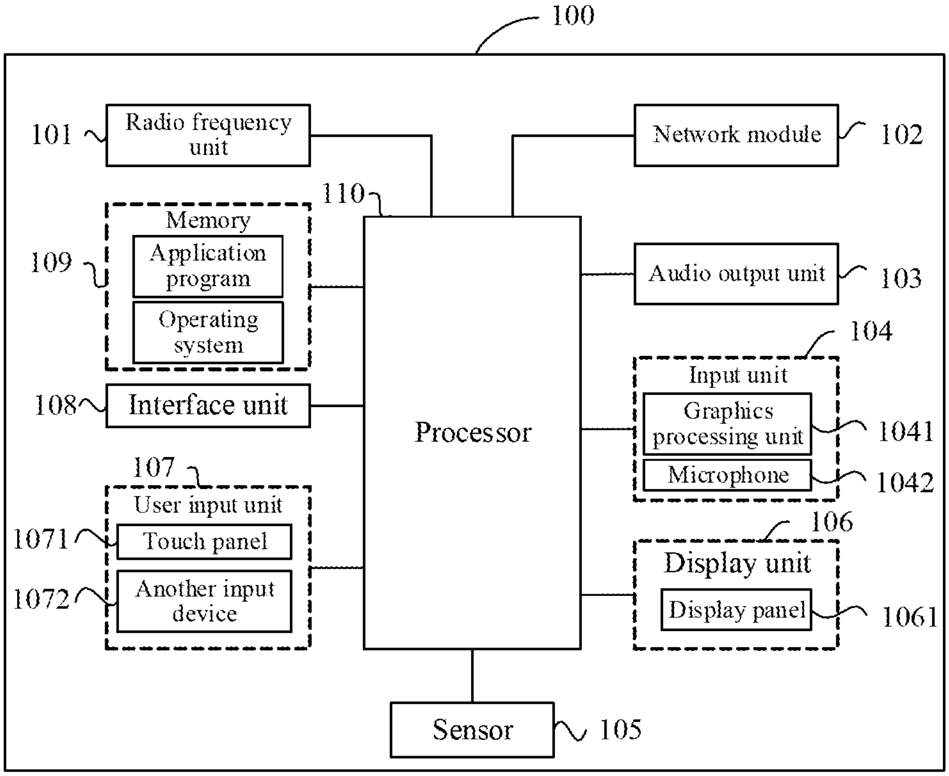
FIG. 20 is a schematic diagram of a hardware structure of a terminal according to an embodiment of this application.

An embodiment of this application further provides a terminal, including a processor and a communication interface. The processor is configured to perform a target operation, to assist a first terminal in positioning, where the target operation includes at least one of the following: transmitting a target message, transmitting a first sidelink positioning reference signal SL-PRS, or selecting a target first resource. The target first resource is used for transmitting the first SL-PRS and/or transmitting the target message. The target message includes at least one of the following: a positioning request, positioning assistance data, or first resource configuration information. The first resource configuration information is used for configuring at least one first resource. The target first resource is one or more resources in the at least one first resource. The first SL-PRS is used for determining: location information of the first terminal and/or second terminal, and/or SL-PRS measurement information. The second terminal is a peer terminal that performs SL communication or SL positioning with the first terminal. This terminal embodiment corresponds to the foregoing terminal-side method embodiment. Each implementation process and implementation of the foregoing method embodiment can be applied to this terminal embodiment, and can achieve the same technical effects. FIG. 20 is a schematic diagram of a hardware structure of a terminal that implements an embodiment of this application.

The terminal 100 includes, but is not limited to, at least some components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include the power supply (for example, a battery) for supplying power to the components. The power supply may be logically connected to the processor 110 by using a power management system, thereby implementing functions such as charging, discharging, and power consumption management by using the power management system. A terminal structure shown in FIG. 20 does not constitute a limitation to the terminal, and the terminal may include more or fewer components than those shown in the figure, or some components may be combined, or a different component deployment may be used. Details are not described herein again.

It should be understood that in embodiments of this application, the input unit 104 may include a graphics processing unit (GPU) 1041 and a microphone 1042, and the graphics processing unit 1041 processes image data of still images or videos obtained by an image capture apparatus (for example, a camera) in a video capture mode or an image capture mode. The display unit 106 may include a display panel 1061, and the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional key (for example, a volume control key or a switch key), a track ball, a mouse, and a joystick, which are not repeated herein.

In this embodiment of this application, after the radio frequency unit 101 receives downlink data from a network side device, the downlink data is processed by the processor 110. In addition, uplink data is sent to the network side device. Generally, the radio frequency unit 101 includes, but not limited to, an antenna, at least one amplifier, a transceiver, a coupler, a low noise amplifier, a duplexer, and the like.

The memory 109 may be configured to store software programs or instructions, and various pieces of data. The memory 109 may mainly include a program or instruction storage area and a data storage area. The program or instruction storage area may store an operating system, an application program or instruction required by at least one function (for example, a sound playing function and an image playing function), or the like. In addition, the memory 109 may include a high speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The memory may include, for example, at least one magnetic disk storage device, a flash memory, or other volatile solid-state storage devices.

The processor 110 may include one or more processing units. Optionally, the processor 110 may integrate an application processor and a modem processor. The application processor mainly processes an operating system, a user interface, an application program, instructions, and the like. The modem processor mainly processes wireless communication, and may be, for example, a baseband processor. It may be understood that the foregoing modem processor may either not be integrated into the processor 110.

The processor 110 is configured to perform a target operation, to assist a first terminal in positioning, where the target operation includes at least one of the following: transmitting a target message, transmitting a first sidelink positioning reference signal SL-PRS, or selecting a target first resource.

The target first resource is used for transmitting the first SL-PRS and/or transmitting the target message.

The target message includes at least one of the following: a positioning request, positioning assistance data, or first resource configuration information.

The first resource configuration information is used for configuring at least one first resource.

The target first resource is one or more resources in the at least one first resource.

The first SL-PRS is used for determining: location information of the first terminal and/or second terminal, and/or SL-PRS measurement information.

The second terminal is a peer terminal that performs SL communication or SL positioning with the first terminal.

Optionally, in a case that the first device is a network side device, the target operation includes at least one of the following: transmitting the target message, selecting the target first resource, or transmitting the first resource configuration information; or in a case that the first device is the first terminal, the target operation includes at least one of the following: transmitting the target message, transmitting the first SL-PRS, transmitting the first resource configuration information, or selecting the target first resource.

Optionally, the processor 110 is configured to perform the target operation, and assist the first terminal in performing positioning on a layer 1 at a higher level of the first device.

Optionally, the radio frequency unit 101 is configured to transmit a location service request at a higher layer before the target operation is performed, where the location service request is used for requesting to trigger the first terminal to perform positioning.

Optionally, the location service request includes at least one of the following: positioning service type of the first terminal; location notification indication information; event reporting information; periodic reporting indication information; priority information; confidential information; or QoS information used for positioning, where the location notification indication information indicates location environment information of the first terminal; the event reporting information includes event information of a first event, and the event reporting information indicates that at least one of location service, location information reporting, or SL-PRS measurement information reporting is triggered under the first event; and the periodic reporting indication information indicates the first terminal and/or the second terminal to periodically trigger at least one of location service, location information reporting, or SL-PRS measurement information reporting.

Optionally, the processor 110 is configured to obtain a first parameter and/or a second parameter provided by a higher layer; or the radio frequency unit 101 is configured to transmit a first parameter and/or a second parameter provided by a higher layer, where the first parameter is used for transmitting the first SL-PRS; and the second parameter is used for selecting the target first resource.

Optionally, the first parameter includes at least one of the following at least one pre-configured resource pool used for transmitting the first SL-PRS and/or the target message; priority information of the SL-PRS; priority information of the target message; a configuration parameter of at least one SL-PRS; or a number of frequency domain resources required by the at least one SL-PRS.

Optionally, the second parameter includes at least one of the following: indication information and/or configuration information of the at least one first resource; time domain and/or frequency domain indication information of the first resource; a measurement window of at least one SL-PRS; a selection window of at least one SL-PRS; an RSRP threshold corresponding to receiving at least one SL-PRS; an RSRP threshold corresponding to sending at least one SL-PRS; a priority threshold corresponding iv at least one SL-PRS; a priority threshold corresponding to sending at least one SL-PRS; a dedicated resource pool parameter of at least one SL-PRS; a proportion of the target first resource in the first resource; or target first resource preemption indication information, where the target first resource preemption indication information indicates whether the target first resource is allowed to be preempted.

Optionally, the first resource configuration information includes a first resource candidate set, and the first resource candidate set includes at least one of the following: identification information of a first resource candidate set; identification information of a first resource of the first resource candidate set; configuration information of the first resource; or configuration information of the first resource candidate set.

Optionally, the selecting the target first resource by the processor 110 includes: excluding a second resource from the first resource candidate set, where the first resource candidate set includes the at least one first resource.

Optionally, the second resource includes at least one of the following; a resource scheduled by first SCI and/or second SCI received by the first terminal re urce used for transmitting the first SCI and/or the second SCI; a resource used for an SS-PBSCH or an SL CSI-RS or an SL DMRS; a resource whose RSRP value does not meet an RSRP threshold for sending an SL-PRS; a resource that does not meet a sending configuration of an SL-PRS; a resource that is indicated by the first SCI and/or the second SCI received by the first terminal as a reserved resource; or a resource scheduled for another terminal to send an SL-PRS.

Optionally, the first SCI includes first-stage SCI or second-stage SCI of third-stage SCI; the second SCI includes first-stage SCI or second-stage SCI or third-stage SCI; and the third-stage SCI is dedicated to scheduling an SL-PRS.

Optionally, that the second resource does not meet the sending configuration of the SL-PRS includes at least one of the following that: an available bandwidth of the second resource is less than a bandwidth of the SL-PRS; a number of available symbols of the second resource is less than a number of symbols of the SL-PRS; a periodicity of the second resource does not meet a requirement of the SL-PRS; a priority of the second resource is higher than a sending priority of the SL-PRS; a subcarrier spacing of the second resource is different from a subcarrier spacing of the SL-PRS; or a CP of the second resource is different from a CP of the SL-PRS.

Optionally, the configuration information of the first resource and/or the configuration information of the first resource candidate set includes at least one of the following: bandwidth information of the first resource and/or the first resource set; a frequency domain position start point of the first resource and/or the first resource set; start RB information of the first resource and/or the first resource set; numerology information of the first resource and/or the first resource set; a subcarrier spacing of the first resource and/or the first resource set; a CP cyclic prefix of the first resource and/or the first resource set: start time of the first resource and/or the first resource set; end time of the first resource and/or the first resource set; duration of the first resource and/or the first resource set; or periodicity information of the first resource and/or the first resource set.

Optionally, the transmission module 402 is configured to send the first SL-PRS in a case that a predetermined condition is met.

The predetermined condition includes at least one of the following that:

received first-stage SCI indicates that an SL-PRS is enabled; or received second-stage SCI includes at least one of the following: a positioning request, positioning assistance data, a positioning feedback resource configuration, a configuration parameter of at least one SL-PRS, or a mode of at east one SL PRS, where the first SL-PRS is one or more SL-PRSs in the at least one SL-PRS.

Optionally, the target message further includes at least one of the following: location reporting or feedback information, SL-PRS measurement reporting or feedback information, a positioning response, or capability information.

Optionally, the positioning request includes at least one of the following: a positioning assistance data request; a measurement request; a location information reporting or feedback request; an SL-PRS measurement reporting or feedback request; a configuration request for at least one SL-PRS; SL-PRS request indication information; or feedback indication information of a measurement request, where the positioning assistance data request is used for requesting the positioning assistance data; the measurement request is used for requesting a device to measure the first SL-PRS; the location information reporting or feedback request is used for requesting the device to report or feed back a resource of the location information, or requesting the device to report or feed back the location information; the SL-PRS measurement reporting or feedback request is used for requesting the device to report or feed back a resource of the SL-PRS measurement information, or requesting the device to report or feed back the SL-PRS measurement information; the configuration request is used for requesting configuration or transmission of the at least one SL-PRS; the SL-PRS request indication information indicates whether the SL-PRS is requested; and the feedback indication information of the measurement request indicates that the first SL-PRS is received, and/or indicates whether the device requested through the measurement request sends feedback information, where the feedback information includes at least one of the following: the location information, the SL-PRS measurement information, or HARQ information.

Optionally, the positioning assistance data request includes at least one of the following: recognition information of a first target terminal; recognition information of a second target terminal; location information of the second target terminal; a region identifier; a communication range: a positioning range; positioning related quality of service QoS information; a resource request for requesting to transmit a time frequency resource of the first SL-PRS: a configuration request for at least one SL-PRS; a location information reporting or feedback request; or an SL-PRS measurement reporting or feedback request, where the first target terminal is any one of the following: the first terminal, the second terminal, and a third terminal; and the second target terminal is any one of the following: the first terminal, the second terminal, and the third terminal.

Optionally, the measurement request includes at least one of the following: positioning type request; frequency band information; a positioning method request; location information type; a measurement signal request; priority information of measurement of the SL-PRS; priority information of transmission of the SL-PRS; expected angle of departure AOD information; or expected angle of arrival AOA information.

Optionally, the positioning request includes at least one of the following: information about at least one SL-PRS configuration set, first SL-PRS configuration information; or second SL-PRS configuration information, where the second SL-PRS configuration information is configuration information of an SL-PRS expected by the first terminal and/or the second terminal; and the information about at least one SL-PRS configuration set includes at least one of the following: identification information of the at least one SL-PRS configuration set; or a configuration parameter of an SL-PRS of the at least one SL-PRS configuration set.

Optionally, the at least one SL-PRS configuration set includes a target SL-PRS configuration set; the target SL-PRS configuration set includes a configuration of at least one target SL-PRS; the first SL-PRS is one or more SL-PRSs in the at least one target SL-PRS; and the target SL-PRS configuration set includes at least one of the following: identification information of the target SL-PRS configuration set; location information of a second target terminal; priority information of measurement of the target SL-PRS; priority information of transmission of the target SL-PRS; expected angle of departure AOD information; expected angle of arrival AOA information; or a configuration parameter of the target SL-PRS in the target SL-PRS configuration set.

Optionally, in a case that an SL-PRS configuration received by the first terminal does not meet a positioning requirement of the first terminal and/or the second terminal, or the SL-PRS configuration received by the first terminal does not include the target SL-PRS the positioning request includes: at least one SL-PRS configuration set for on-demand selection, where the at least one SL-PRS configuration set includes a configuration of at least one target SL-PRS; and the first SL-PRS is one or more SL-PRSs in the at least one target SL-PRS.

Optionally, the second SL-PRS configuration information includes at least one of the following: bandwidth information of the SL-PRS; sending start time of the SL-PRS; sending end time of the SL-PRS; sending duration of the SL-PRS; measurement window information of the SL-PRS; configuration window information for configuring the SL-PRS; a number of combs configured for the SL-PRS; an SL-PRS number of symbols; a target terminal set; a number of target terminals; identification information of a target terminal; a set of selected SL-PRSs; resources of the selected SL-PRSs; identification information of the selected SL-PRSs; a resource set of the selected SL-PRSs; or a number of the selected SL-PRSs.

Optionally, the first SL-PRS configuration information includes at least one of the following: a configuration parameter of an SL-PRS; a maximum number of frequency layers of the SL-PRS; SL-PRS positioning frequency layer information; an SL-PRS subcarrier spacing; an SL-PRS resource bandwidth; a start point of an SL-PRS PRB; a frequency domain position start point of the SL-PRS; an SL-PRS comb size N; an SL-PRS cyclic prefix; an SL-PRS configuration per frequency layer; identification information of the SL-PRS; PCI of the SL-PRS; an absolute radio frequency channel number ARFCN; a cell global identity NCGI; a maximum number of SL-PRS resource sets; SL-PRS resource set information; an SL-PRS resource set identifier; an SL-PRS periodicity and resource set slot offset; an SL-PRS resource repetition factor; an SL-PRS resource time gap; an SL-PRS number of symbols; a first muting option of the SL-PRS; a second muting option of the SL-PRS; resource power information of the SL-PRS; a maximum number of SL-PRS resources included in each SL-PRS set in the least one SL-PRS resource set; SL-PRS resource information; an SL-PRS resource identifier; an SL-PRS sequence identifier; an SL-PRS RE offset; an SL-PRS resource slot offset; or an SL-PRS resource symbol offset.

Optionally, the first SL-PRS configuration information includes a configuration parameter of a dedicated resource; and the first SL-PRS is transmitted based on the dedicated resource, where the dedicated resource comprises at least one of the following: a resource dedicated to SL-PRS scheduling, or a resource dedicated to SL-PRS transmission.

Optionally, the configuration parameter of the dedicated resource includes at least one of the following: bandwidth information of the dedicated resource; a frequency domain position start point of the dedicated resource; start RB information of the dedicated resource; numerology information of the dedicated resource; a subcarrier spacing of the dedicated resource; a CP cyclic prefix of the dedicated resource; start time of the dedicated resource; end time of the dedicated resource; duration of the dedicated resource; or dedicated resource pool information.

Optionally, the transmission module 402 is configured to transmit the first SL-PRS and a Uu interface positioning reference signal.

Optionally, the positioning request includes at least one of the following:

- the positioning assistance data request and/or a Uu interface positioning assistance data request;
- the measurement request and/or a Uu interface signal measurement request;
- the location information reporting or feedback request and/or a Uu interface location information reporting or feedback request;
- at least one SL-PRS configuration set, and/or at least one downlink sounding reference signal SRS configuration set, and/or at least one uplink SRS configuration set; or
- the SL-PRS measurement reporting or feedback request and/or the Uu interface measurement reporting or feedback request.

Optionally, the positioning assistance data includes at least one of the following: a time frequency resource used for sending the SL-PRS; a time frequency resource for location information reporting or feedback; a time frequency resource for measurement information reporting or feedback; at least one SL-PRS configuration set; identification information of the at least one SL-PRS configuration set; a configuration parameter of an SL-PRS in each SL-PRS configuration set; recognition information of a first target terminal; recognition information of a second target terminal, a region identifier; a communication range; a positioning range; positioning related quality of service QoS information; priority information of measurement of the target SL-PRS; or priority information of transmission of the target SL-PRS. The first target terminal is any one of the following: the first terminal, the second terminal, and a third terminal; and the second target terminal is any one of the following: the first terminal, the second terminal, and the third terminal.

Optionally, the positioning assistance data includes positioning assistance data of at least one target terminal. The positioning assistance data further includes at least one of the following: location information of the at least one target terminal; SL-PRS measurement information of the at least one target terminal; type information of the at least one target terminal: expected angle of departure AOD information corresponding to a target terminal; or expected angle of arrival AOA information corresponding to the target terminal, where the location information includes at least one of the following: absolute location information, relative location information, trajectory information, path information, speed information, or acceleration information; the SL-PRS measurement information includes at least one of the following: reference signal received p RSRP measurement information, reference signal time difference measurement information, receive and transmit time difference measurement information, arrival time measurement information, reference signal recognition information, reference signal received power information, angle measurement information, or transmitting and receiving point identification information; and the type information indicates any one of the following: whether the target terminal supports the SL-PRS, or whether the target terminal supports an SL positioning method, or whether the target terminal is indicated as an RSU device, or whether the target terminal is a specific type of terminal or a normal terminal.

Optionally, the positioning assistance data of at least one target terminal includes at least one of the following SL-PRS information corresponding to the target terminal: the time frequency resource used for sending the SL-PRS; a time frequency resource for the SL-PRS measurement reporting or feedback; the time frequency resource for the location information reporting or feedback; the time frequency resource for the measurement information reporting or feedback; the at least one SL-PRS configuration set; the identification information of the at least one SL-PRS configuration set; the priority information of measurement and/or transmission of the SL-PRS; the expected angle of departure AOD information of transmission and/or measurement of the SL-PRS; the expected angle of arrival AOA information of transmission and/or measurement of the SL-PRS; or the configuration parameter of the SL-PRS in each SL-PRS configuration set.

Optionally, the SL-PRS measurement reporting or feedback information includes at least one of the following: recognition information of a first target terminal; recognition information of a second target terminal; location information of the second target terminal; or SL-PRS measurement information, where the SL-PRS measurement information includes at least one of the following: RSRP measurement information, reference signal time difference measurement information, receive and transmit time difference measurement information, arrival time measurement information, reference signal recognition information, reference signal received power information, angle measurement information, or transmitting and receiving point identification information; the location information includes at least one of the following: absolute location information, relative location information, trajectory information, path information, speed information, or acceleration information; and the first target terminal is any one of the following: the first terminal, the second terminal, and a third terminal; and the second target terminal is any one of the following: the first terminal, the second terminal, and the third terminal.

Optionally, the positioning response includes at least one of the following: error indication information; error type information; no available resource information; error cause information; positive acknowledgment ACK information; negative acknowledgment NACK information; unsupported on-demand selection of PRS information; identification information of at least one SL-PRS configuration set; request success indication information or request failure indication information; configuration success indication information or configuration failure indication information; a configuration parameter of an SL-PRS of the at least one SL-PRS configuration set; recognition information of a first target terminal; recognition information of a second target terminal; a region identifier communication range; a positioning range; positioning related QoS information, a time frequency resource used for sending the SL-PRS; or a time frequency resource for SL-PRS measurement reporting or feedback. The first target terminal is any one of the following: the first terminal, the second terminal, and a third terminal; and the second target terminal is any one of the following: the first terminal, the second terminal, and the third terminal.

Optionally, the capability information includes at least one of the following: an SL-PRS processing capability; or a capability of an SL positioning method.

The SL-PRS processing capability includes at least one of the following: capability of processing an SL-PRS and a DL PRS simultaneously, a capability of processing an SL-PRS and a UL PRS simultaneously, an S-PRS buffer pe, an SL-PRS-supported frequency band, a number of SL-PRS-supported frequency bands, a capability of supporting carrier aggregation, a maximum capability of processing an SL-PRS, SL-PRS duration, or a number of sent SL-PRSs. The capability of the SL positioning method includes at least one of the following: an SL-PRS measurement capability, a positioning mode, a multi-beam sending or measurement capability, quasi-co-location QCL, a path loss reference signal capability, a capability of supporting multipath measurement or reporting, or a capability of supporting first path measurement or reporting. The SL-PRS measurement capability includes at least one of the following: a maximum number of sending terminals measured, or a number of frequency layers measured.

Optionally, the target message includes at least one of the following: indication information within coverage; or indication information out of coverage.

Optionally, in case that the transmission module 402 transmits the target message with a network side device, the target message is transmitted through one or more of the following messages: dynamic grant information; configured grant information; an LPP message; an RRC message; and a MAC CE message.

Optionally, in a case that the transmission module 402 transmits the target message with another terminal, the target message is transmitted through one or more of the following messages: sidelink control information SCI; a physical sidelink shared channel PSSCH; a PC5 LPP message; and a PC5 RRC message.

Optionally, the target message includes time domain offset information. The time domain offset information includes at least one of the following: offset information between SL-PRS measurement reporting or feedback and an SL-PRS; offset information between location information reporting or feedback and the SL-PRS; offset information between the positioning request and the SL-PRS; offset information between the positioning request and the SL-PRS measurement reporting or feedback; offset information between the SCI and the SL-PRS; offset information between the SCI and the SL-PRS measurement reporting or feedback: offset information between the SCI and the location information reporting or feedback; or offset information between the SCI and the positioning request.

Optionally, the SCI includes at least one of the following: first-stage SCI, second-stage SCI, or third-stage SCI, where the third SCI is dedicated to scheduling an SL-PRS.

Optionally, the radio frequency unit 101 is configured to send the target message. The radio frequency unit 101 is further configured to receive a first message before sending the target message; and/or receive a second message after sending the target message.

Optionally, the target message includes a positioning request; the first message includes positioning assistance data or a positioning response; and the second message includes configuration information of a target SL-PRS or activation information of the target SL-PRS.

Optionally, the radio frequency unit 101 is configured to receive the target message; and the radio frequency unit 101 is further configured to receive a third message before receiving the target message; and/or receive a fourth message after receiving the target message.

Optionally, the target message includes a positioning request; the third message includes positioning assistance data; and the fourth message includes a positioning response, where in a case that the positioning request includes an SL-PRS measurement or reporting request, the positioning response includes a time frequency resource for SL-PRS measurement reporting or feedback of the SL-PRS; in a case that the positioning request includes a location information reporting or feedback request, the positioning response includes location information of a target terminal; in a case that the positioning request includes an SL-PRS measurement reporting or feedback request, the positioning response includes measurement information of the target terminal; and the target terminal is any one of the following: the first terminal, the second terminal, and the third terminal.

In the terminal provided in embodiments of this application, the terminal requests, by performing the target operation, the first terminal to perform positioning. The target operation includes at least one of the following: transmitting the target message (including the positioning request and/or the positioning assistance data and/or the first resource configuration information), transmitting the first SL-PRS, or selecting the target first resource. In this way, the target operation is performed, to request the first terminal to perform positioning, and then the location information or measurement information of the first terminal and/or the second terminal that performs SL communication or SL positioning with the first terminal is determined, thereby realizing positioning between terminals, solving the current situation that positioning needs to be performed under sufficient network or GPS coverage, and improving communication energy efficiency of the system.

An embodiment of this application further provides a network side device, including a processor and a communication interface. The processor is configured to perform a target operation, to assist a first terminal in positioning, where the target operation includes at least one of the follow transmitting a target message, transmitting a first sidelink positioning reference signal SL-PRS, or selecting a target first resource. The target first resource is used for transmitting the first SL-PRS and/or transmitting the target message. The target message includes at least one of the following: a positioning request, positioning assistance data, or first resource configuration information. The first resource configuration information is used for configuring at least one first resource. The target first resource is one or more resources in the at least one first resource. The first SL-PRS is used for determining: location information of the first terminal and/or second terminal, and/or SL-PRS measurement information. The second terminal is a peer terminal that performs SL communication or SL positioning with the first terminal. This network side device embodiment corresponds to the foregoing network side device method embodiment. Each implementation process and implementation of the foregoing method embodiment can be applied to this network side device embodiment, and can achieve the same technical effects.

Figure 21:
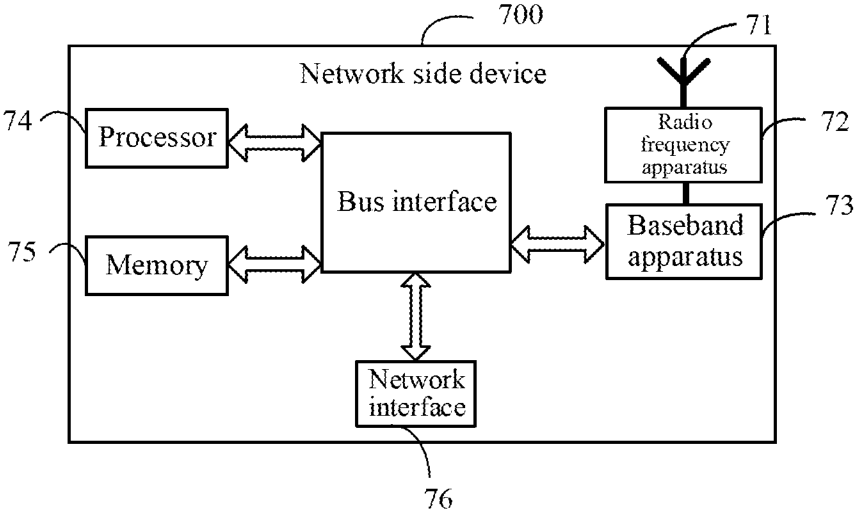
FIG. 21 is a schematic diagram of a hardware structure of a network side device according to an embodiment of this application.

Optionally, an embodiment of this application further provides a network side device. As shown in FIG. 21, the network side device 700 includes: an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes information to be sent, and sends the information to the radio frequency apparatus 72. The radio frequency apparatus 72 processes the received information and sends the information by using the antenna 71, The frequency band processing apparatus may be located in the baseband apparatus 73, and the method performed by the network side device in the foregoing embodiment may be implemented in the baseband apparatus 73, where the baseband apparatus 73 includes a processor 74 and a memory 75.

The baseband apparatus 73 may include, for example, at least one baseband plate. A plurality of chips are disposed on the baseband plate. As shown in FIG. 21, one of the plurality of chips is, for example, the processor 74, and is connected to the memory 75, to invoke a program in the memory 75 to perform operations of the network device in the foregoing method embodiment.

The baseband apparatus 73 may further include a network interface. 76, configured to exchange information with the radio frequency apparatus 72. The interface is, for example, a common public radio interface (CPRI).

Optionally, the network side vice provided in this embodiment of this application further includes: instructions or a program stored in the memory 75 and runnable on the processor 74. The processor 74 invokes the instructions or the program in the memory 75 to perform the method executed by each module shown in FIG. 17 or FIG. 18, and achieve the same technical effects. To avoid repetition, details are not repeated herein.

An embodiment of this application further provides a non-transitory readable storage medium. The non-transitory readable storage medium stores a program or instructions, where when the program or the instructions are executed by a processor, the processes of embodiments of the foregoing positioning method are implemented, and the same technical effects are achieved. To avoid repetition, details are not described herein again.

The processor is the processor in the terminal described in the foregoing embodiment. The non-transitory readable storage medium includes a non-transitory computer-readable storage medium, and is, for example, a read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions, to implement the processes of embodiments of the foregoing positioning method, and achieve the same technical effects. To avoid repetition, details are not described herein again.

It should be understood that the chip described in embodiments of this application may also be referred to as a system-level chip, a system chip, a chip system, a system-on-chip chip, or the like.

It should be noted that the term “include”, “include” or any other variation thereof in this specification is intended to cover a non-exclusive inclusion, which specifies the presence of stated processes, methods, objects, or apparatuses, but does not preclude the presence or addition of one or more other processes, methods, objects, or appratuses. Without more limitations, elements defined by the sentence “including one” does not exclude that there are still other same elements in the processes, methods, objects, or apparatuses. It should be noted that the scope of the method and the apparatus in the implementations of this application is not limited to performing the functions in the order shown or discussed, but may further include performing the functions in a substantially simultaneous manner or in the reverse order depending on the functions involved. For example, the described method may be performed in an order different from that described, and various steps may be further added, omitted, or combined. In addition, features described with reference to some examples may be combined in other examples.

Through the descriptions of the foregoing implementations, a person skilled in the art may clearly understand that the methods in the foregoing embodiments may be implemented via software and a necessary general hardware platform, and certainly, may also be implemented by hardware. Based on such an understanding, the technical solutions of this application essentially or the part contributing to the prior art may be implemented in a form of a computer software product. The computer software product is stored in a storage medium (for example, a ROM/RAM, a magnetic disk, or an optical disc) and includes several instructions for instructing a terminal (which may be a mobile phone, a computer, a server, an air conditioner, a network device, or the like) to perform the method described in embodiments of this application.

Embodiments of this application are described above with reference to the accompanying drawings. However, this application is not limited to the foregoing implementations. The foregoing implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A positioning method, comprising:

performing, by a first device, a target operation, to assist a first terminal in positioning, wherein the target operation comprises at least one of:

transmitting a target message, or transmitting a first sidelink positioning reference signal (SL-PRS);

wherein the target message comprises a positioning request and time domain offset information;

the first SL-PRS is used for determining: location information of the first terminal and/or second terminal, and/or SL-PRS measurement information; and the second terminal is a peer terminal that performs sidelink (SL) communication or SL positioning with the first terminal;
wherein the target message is transmitted through sidelink control information (SCI); wherein the SCI is dedicated to scheduling an SL-PRS;
the positioning request comprises SL-PRS request indication information; wherein the SL-PRS request indication information indicates whether the SL-PRS is requested; and
the time domain offset information comprises offset information between the SCI and the SL-PRS;
wherein the method further comprises:
obtaining, by the first device, a second parameter provided by a higher layer, wherein the second parameter is used for selecting a target first resource, and the target first resource is used for transmitting the first SL-PRS; wherein
the second parameter comprises:
indication information of at least one first resource; wherein the target first resource is one or more resources in the at least one first resource; and
a dedicated resource pool parameter of at least one SL-PRS.

2. The method according to claim 1, wherein
in a case that the first device is the first terminal, the target operation comprises at least one of: transmitting the target message, transmitting the first SL-PRS, or selecting the target first resource.

3. The method according to claim 1, wherein the performing, by a first device, a target operation, to assist a first terminal in positioning comprises:
performing, by the first device, the target operation, and assisting at a higher level of the first device, the first terminal in performing positioning on a layer 1.

4. The method according to claim 1, wherein before the performing, by a first device, a target operation, the method further comprises:
transmitting, by the first device, a location service request at the higher layer, wherein
the location service request is used for requesting to trigger the first terminal to perform positioning;
the location service request comprises at least one of:
a positioning service type of the first terminal;
location notification indication information;
event reporting information;
periodic reporting indication information;
priority information;
confidential information; or
quality of service (QoS) information used for positioning, wherein
the location notification indication information indicates location environment information of the first terminal;
the event reporting information comprises event information of a first event, and the event reporting information indicates that at least one of location service, location information reporting, or SL-PRS measurement information reporting is triggered under the first event; and
the periodic reporting indication information indicates the first terminal and/or the second terminal to periodically trigger at least one of location service, location information reporting, or SL-PRS measurement information reporting.

5. The method according to claim 1 wherein
the second parameter further comprises at least one of:
configuration information of the at least one first resource;
time domain and/or frequency domain indication information of the first resource;
a measurement window of at least one SL-PRS;
a selection window of at least one SL-PRS;
a reference signal received power (RSRP) threshold corresponding to receiving at least one SL-PRS;
an RSRP threshold corresponding to sending at least one SL-PRS;
a priority threshold corresponding to receiving at least one SL-PRS;
a priority threshold corresponding to sending at least one SL-PRS;
a proportion of the target first resource in the first resource; or
target first resource preemption indication information, wherein
the target first resource preemption indication information indicates whether the target first resource is allowed to be preempted.

6. The method according to claim 1, wherein the transmitting the first SL-PRS comprises:
transmitting the first SL-PRS in a case that a predetermined condition is met, wherein
the predetermined condition comprises at least one of that:
received first-stage sidelink control information (SCI) indicates that an SL-PRS is enabled; or
received second-stage SCI comprises at least one of: a positioning request, positioning assistance data, a location information reporting or feedback resource configuration, an SL-PRS measurement reporting or feedback resource configuration, a configuration parameter of at least one SL-PRS, or a mode of at least one SL-PRS, wherein
the first SL-PRS is one or more SL-PRSs in the at least one SL-PRS.

7. The method according to claim 1, wherein the target message further comprises at least one of: location reporting or feedback information, SL-PRS measurement reporting or feedback information, a positioning response, or capability information.

8. The method according to claim 1, wherein
the positioning request further comprises at least one of:
a positioning assistance data request;
a measurement request;
a location information reporting or feedback request;
an SL-PRS measurement reporting or feedback request;
a configuration request for at least one SL-PRS; or
feedback indication information of a measurement request, wherein
the positioning assistance data request is used for requesting positioning assistance data;
the measurement request is used for requesting a device to measure the first SL-PRS;
the location information reporting or feedback request is used for requesting the device to report or feed back a resource of the location information, or requesting the device to report or feed back the location information;
the SL-PRS measurement reporting or feedback request is used for requesting the device to report or feed back a resource of the SL-PRS measurement information, or requesting the device to report or feed back an SL-PRS measurement information;
the configuration request is used for requesting configuration or transmission of the at least one SL-PRS; and
the feedback indication information of the measurement request indicates that the first SL-PRS is received, and/or indicates whether the device requested through the measurement request sends feedback information, wherein the feedback information comprises at least one of:
the location information, the SL-PRS measurement information, or hybrid automatic repeat request (HARQ) information.

9. The method according to claim 8, wherein
the positioning assistance data request comprises at least one of:
recognition information of a first target terminal;
recognition information of a second target terminal;
location information of the second target terminal;
a region identifier;
a communication range;
a positioning range;
positioning related quality of service (QoS) information;
a resource request for requesting to transmit a time frequency resource of the first SL-PRS;
the configuration request for at least one SL-PRS;
the location information reporting or feedback request; or
the SL-PRS measurement reporting or feedback request, wherein
the first target terminal is any one of: the first terminal, the second terminal, and a third terminal; and the second target terminal is any one of: the first terminal, the second terminal, and the third terminal;
or,
the measurement request comprises at least one of:
a positioning type request;
frequency band information;
a positioning method request;
a location information type;
a measurement signal request;
priority information of measurement of an SL-PRS;
priority information of transmission of the SL-PRS;
expected angle of departure (AOD) information; or
expected angle of arrival (AOA) information.

10. The method according to claim 1, wherein
the positioning request further comprises at least one of:
information about at least one SL-PRS configuration set;
first SL-PRS configuration information; or
second SL-PRS configuration information, wherein
the second SL-PRS configuration information is configuration information of an SL-PRS expected by the first terminal and/or the second terminal; and
the information about at least one SL-PRS configuration set comprises at least one of:
identification information of the at least one SL-PRS configuration set; or
a configuration parameter of an SL-PRS of the at least one SL-PRS configuration set.

11. The method according to claim 10, wherein the second SL-PRS configuration information comprises at least one of:
bandwidth information of the SL-PRS;
sending start time of the SL-PRS;
sending end time of the SL-PRS;
sending duration of the SL-PRS;
measurement window information of the SL-PRS;
configuration window information for configuring the SL-PRS;
a number of combs configured for the SL-PRS;
an SL-PRS number of symbols;
a target terminal set;
a number of target terminals;
identification information of a target terminal;
a set of selected SL-PRSs;
resources of the selected SL-PRSs;
identification information of the selected SL-PRSs;
a resource set of the selected SL-PRSs; or
a number of the selected SL-PRSs.

12. The method according to claim 10, wherein the first SL-PRS configuration information comprises at least one of:
a configuration parameter of the SL-PRS;
a maximum number of frequency layers of the SL-PRS;
SL-PRS positioning frequency layer information;
an SL-PRS subcarrier spacing;
an SL-PRS resource bandwidth;
a start point of an SL-PRS physical resource block (PRB);
a frequency domain position start point of the SL-PRS;
an SL-PRS comb size N;
an SL-PRS cyclic prefix;
an SL-PRS configuration per frequency layer;
identification information of the SL-PRS;
physical cell identifier (PCI) of the SL-PRS;
an absolute radio frequency channel number (ARFCN);
a cell global identity;
a maximum number of SL-PRS resource sets;
SL-PRS resource set information;
an SL-PRS resource set identifier;
an SL-PRS periodicity and resource set slot offset;
an SL-PRS resource repetition factor;
an SL-PRS resource time gap;
an SL-PRS number of symbols;
a first muting option of the SL-PRS;
a second muting option of the SL-PRS;
resource power information of the SL-PRS;
a maximum number of SL-PRS resources comprised in each SL-PRS resource set in the at least one SL-PRS resource set;
SL-PRS resource information;
an SL-PRS resource identifier;
an SL-PRS sequence identifier;
an SL-PRS resource element (RE) offset;
an SL-PRS resource slot offset; or
an SL-PRS resource symbol offset.

13. The method according to claim 1, wherein the target message further comprises at least one of:
indication information within coverage; or
indication information out of coverage.

14. A communication device, being a first device, comprising a processor, a memory, and a program or instructions stored in the memory and executable on the processor, wherein the program or the instructions, when executed by the processor, cause the communication device to perform:
performing a target operation, to assist a first terminal in positioning, wherein
the target operation comprises at least one of:
transmitting a target message, or transmitting a first sidelink positioning reference signal (SL-PRS);
wherein the target message comprises: a positioning request and time domain offset information;
the first SL-PRS is used for determining: location information of the first terminal and/or second terminal, and/or SL-PRS measurement information; and
the second terminal is a peer terminal that performs sidelink (SL) communication or SL positioning with the first terminal;
wherein the target message is transmitted through sidelink control information (SCI); wherein the SCI is dedicated to scheduling an SL-PRS;

the positioning request comprises SL-PRS request indication information; wherein the SL-PRS request indication information indicates whether the SL-PRS is requested; and the time domain offset information comprises offset information between the SCI and the SL-PRS;

wherein the program or the instructions, when executed by the processor, cause the communication device to further perform:

obtaining a second parameter provided by a higher layer, wherein the second parameter is used for selecting a target first resource, and the target first resource is used for transmitting the first SL-PRS; wherein the second parameter comprises:

indication information of at least one first resource; wherein the target first resource is one or more resources in the at least one first resource; and a dedicated resource pool parameter of at least one SL-PRS.

15. The communication device according to claim 14, wherein before the performing, by a first device, a target operation, the method further comprises:

transmitting, by the first device, a location service request at the higher layer, wherein the location service request is used for requesting to trigger the first terminal to perform positioning;

the location service request comprises at least one of:

a positioning service type of the first terminal;

location notification indication information;

event reporting information;

periodic reporting indication information;

priority information;

confidential information; or quality of service (QoS) information used for positioning, wherein the location notification indication information indicates location environment information of the first terminal;

the event reporting information comprises event information of a first event, and the event reporting information indicates that at least one of location service, location information reporting, or SL-PRS measurement information reporting is triggered under the first event; and the periodic reporting indication information indicates the first terminal and/or the second terminal to periodically trigger at least one of location service, location information reporting, or SL-PRS measurement information reporting.

16. The communication device according to claim 15, wherein the positioning assistance data request comprises at least one of:

recognition information of a first target terminal;

recognition information of a second target terminal;

location information of the second target terminal;

a region identifier;

a communication range;

a positioning range;

positioning related quality of service (QoS) information;

a resource request for requesting to transmit a time frequency resource of the first SL-PRS;

the configuration request for at least one SL-PRS;

the location information reporting or feedback request; or the SL-PRS measurement reporting or feedback request, wherein the first target terminal is any one of: the first terminal, the second terminal, and a third terminal; and the second target terminal is any one of: the first terminal, the second terminal, and the third terminal; or, the measurement request comprises at least one of:

a positioning type request;

frequency band information;

a positioning method request;

a location information type;

a measurement signal request;

priority information of measurement of an SL-PRS;

priority information of transmission of the SL-PRS;

expected angle of departure (AOD) information; or expected angle of arrival (AOA) information.

17. The communication device according to claim 14, wherein the positioning request further comprises at least one of:

a positioning assistance data request;

a measurement request;

a location information reporting or feedback request;

an SL-PRS measurement reporting or feedback request;

a configuration request for at least one SL-PRS; or

SL-PRS request indication information; or feedback indication information of a measurement request, wherein the positioning assistance data request is used for requesting positioning assistance data;

the measurement request is used for requesting a device to measure the first SL-PRS;

the location information reporting or feedback request is used for requesting the device to report or feed back a resource of the location information, or requesting the device to report or feed back the location information;

the SL-PRS measurement reporting or feedback request is used for requesting the device to report or feed back a resource of the SL-PRS measurement information, or requesting the device to report or feed back an SL-PRS measurement information;

the configuration request is used for requesting configuration or transmission of the at least one SL-PRS; and the SL-PRS request indication information indicates whether an SL-PRS is requested; and the feedback indication information of the measurement request indicates that the first SL-PRS is received, and/or indicates whether the device requested through the measurement request sends feedback information, wherein the feedback information comprises at least one of: the location information, the SL-PRS measurement information, or hybrid automatic repeat request (HARQ) information.

18. A non-transitory readable storage medium, storing a program or instructions, wherein the program or the instructions, when executed by a processor of a first device, cause the first device to perform:

performing a target operation, to assist a first terminal in positioning, wherein the target operation comprises at least one of:

transmitting a target message, or transmitting a first sidelink positioning reference signal (SL-PRS);

wherein the target message comprises a positioning request and time domain offset information;

the first SL-PRS is used for determining: location information of the first terminal and/or second terminal, and/or SL-PRS measurement information; and the second terminal is a peer terminal that performs sidelink (SL) communication or SL positioning with the first terminal;

wherein the target message is transmitted through sidelink control information (SCI); wherein the SCI is dedicated to scheduling an SL-PRS;

the positioning request comprises SL-PRS request indication information; wherein the SL-PRS request indication information indicates whether the SL-PRS is requested; and the time domain offset information comprises offset information between the SCI and the SL-PRS;

wherein the program or the instructions, when executed by the processor, cause the first device to further perform:

obtaining a second parameter provided by a higher layer, wherein the second parameter is used for selecting a target first resource, and the target first resource is used for transmitting the first SL-PRS; wherein the second parameter comprises:

indication information of at least one first resource; wherein the target first resource is one or more resources in the at least one first resource; and a dedicated resource pool parameter of at least one SL-PRS.

* * * * *